US011195232B2

(12) United States Patent
Sivaramakrishnan

(10) Patent No.: US 11,195,232 B2
(45) Date of Patent: Dec. 7, 2021

(54) METHODS AND APPARATUS EMPLOYING HIERARCHICAL CONDITIONAL VALUE AT RISK TO MINIMIZE DOWNSIDE RISK OF A MULTI-ASSET CLASS PORTFOLIO AND IMPROVED GRAPHICAL USER INTERFACE

(71) Applicant: Axioma, Inc., New York, NY (US)

(72) Inventor: Kartik Sivaramakrishnan, Marietta, GA (US)

(73) Assignee: Axioma, Inc., New York, NY (US)

( * ) Notice: Subject to any disclaimer, the term of this patent is extended or adjusted under 35 U.S.C. 154(b) by 0 days.

(21) Appl. No.: 17/131,914

(22) Filed: Dec. 23, 2020

(65) Prior Publication Data

US 2021/0110479 A1 Apr. 15, 2021

Related U.S. Application Data

(63) Continuation of application No. 15/280,144, filed on Sep. 29, 2016, now abandoned.

(60) Provisional application No. 62/333,563, filed on May 9, 2016.

(51) Int. Cl.
*G06Q 40/06* (2012.01)
(52) U.S. Cl.
CPC .................... *G06Q 40/06* (2013.01)
(58) Field of Classification Search
CPC ...................................................... G06Q 40/06
USPC ....................................................... 705/36 R
See application file for complete search history.

(56) References Cited

U.S. PATENT DOCUMENTS

| | | | |
|---|---|---|---|
| 5,831,631 | A | 11/1998 | Light et al. |
| 5,832,133 | A | 11/1998 | Smith |
| 7,409,357 | B2 | 8/2008 | Schaf et al. |
| 7,630,931 | B1 | 12/2009 | Rachev et al. |
| 7,698,202 | B2 | 4/2010 | Stubbs et al. |
| 7,711,617 | B2 | 5/2010 | Rachev et al. |
| 7,778,897 | B1 | 8/2010 | Rachev et al. |
| 7,890,409 | B2 | 2/2011 | Rachev et al. |

(Continued)

OTHER PUBLICATIONS

Rokafellar, R.T., et al., "Optimization of Conditional-Value-at-Risk", "Journal of Risk", 2000, pp. 493-517, vol. 2.

(Continued)

*Primary Examiner* — Ayal I. Sharon
(74) *Attorney, Agent, or Firm* — Ryan, Mason & Lewis, LLP

(57) ABSTRACT

The traditional Markowitz mean-variance-optimization (MVO) framework that uses the standard deviation of the possible portfolio returns as a measure of risk does not accurately measure the risk of multi-asset class portfolios whose return distributions are non-Gaussian and asymmetric. A scenario-based conditional value-at-risk (CVaR) approach for minimizing the downside risk of a multi-asset class portfolio is addressed that uses Monte-Carlo simulations to generate the asset return scenarios. These return scenarios are incorporated into a modified Rockafellar-Uryasev based convex programming formulation to generate an optimized hedge. One example addresses hedging in an equity portfolio with options. Testing shows that a hierarchical CVaR approach generates portfolios with better predicted worst case loss, downside risk, standard deviation, and skew.

10 Claims, 19 Drawing Sheets

(56) References Cited

U.S. PATENT DOCUMENTS

| | | |
|---|---|---|
| 8,170,941 B1 | 5/2012 | Rachev et al. |
| 8,301,537 B1 | 10/2012 | Rachev et al. |
| 8,315,936 B2 | 11/2012 | Stubbs et al. |
| 8,355,976 B2 | 1/2013 | Ghosh et al. |
| 8,533,089 B1 | 9/2013 | Renshaw |
| 8,533,107 B2 | 9/2013 | Bell et al. |
| 8,700,516 B2 | 4/2014 | Bell et al. |
| 2003/0005082 A1 | 1/2003 | Shah et al. |
| 2004/0177022 A1* | 9/2004 | Williams ............... G06Q 40/08 705/36 R |
| 2006/0059065 A1 | 3/2006 | Glinberg et al. |
| 2007/0036456 A1 | 2/2007 | Hooper |
| 2007/0106625 A1 | 5/2007 | Kashima |
| 2007/0233585 A1 | 10/2007 | Ben Simon et al. |
| 2008/0062177 A1 | 3/2008 | Gaul et al. |
| 2010/0053167 A1 | 3/2010 | Shinohara et al. |
| 2011/0254862 A1 | 10/2011 | Okano |
| 2011/0289017 A1 | 11/2011 | Renshaw |
| 2012/0194503 A1 | 8/2012 | Chauvin |
| 2013/0041848 A1 | 2/2013 | Stubbs et al. |
| 2013/0080353 A1 | 3/2013 | Kovarsky et al. |
| 2013/0187923 A1 | 7/2013 | Yoshimoto et al. |
| 2013/0304671 A1 | 11/2013 | Renshaw |
| 2013/0332391 A1 | 12/2013 | Renshaw |
| 2014/0081889 A1 | 3/2014 | Renshaw |
| 2014/0101073 A1 | 4/2014 | Labrie |
| 2014/0108295 A1 | 4/2014 | Renshaw |
| 2014/0201107 A1 | 7/2014 | Bell et al. |
| 2014/0279681 A1 | 9/2014 | Cole |
| 2015/0081592 A1 | 3/2015 | Stubbs et al. |
| 2016/0071213 A1 | 3/2016 | Renshaw |
| 2016/0086278 A1 | 3/2016 | Renshaw |
| 2016/0098796 A1 | 4/2016 | Jeet et al. |
| 2016/0104244 A1* | 4/2016 | Walker ................... G06Q 40/06 705/36 R |
| 2016/0110811 A1 | 4/2016 | Siu et al. |
| 2016/0184016 A1 | 6/2016 | Albright |
| 2016/0283970 A1 | 9/2016 | Ghavamzadeh et al. |
| 2016/0379306 A1* | 12/2016 | Slotterback ............ G06Q 40/06 705/36 R |
| 2017/0248942 A1 | 8/2017 | Sudo et al. |
| 2017/0277568 A1* | 9/2017 | Lu .................... G06Q 10/06312 |
| 2017/0323385 A1 | 11/2017 | Kartik |

OTHER PUBLICATIONS

Rokafellar, R.T., et al., "Conditional Value-at-Risk for General Loss Distributions", "Journal of Banking & Finance", 2002, pp. 1443-1471, No. 26.

Uryasev, S., "Conditional Value-at-Risk: Optimizaiton Algorithms and Applications", "Financial Engineering News", 2000, vol. 14.

* cited by examiner

| Portfolio | Risk: Stdev of Returns | CVaR | Right CVaR |
|---|---|---|---|
| S&P 500 Index | 6.48% | 13.45% | 13.31% |
| S&P 500 Index Plus Short Call | 3.78% | 10.55% | 2.78% |

| Portfolio | CVaR (ε = 95%) | Mean Return | Stdev of Returns | MVO | Worst Return | Best Return | VaR (ε = 95%) | Right CVaR (ε = 95%) |
|---|---|---|---|---|---|---|---|---|
| No Hedge | 13.99% | -0.08% | 6.78% | 13.66% | -29.31% | 28.48% | 11.21% | 13.97% |
| Delta-Gamma | 10.50% | -0.45% | 5.94% | 11.00% | -16.53% | 27.48% | 9.14% | 12.97% |
| Delta-Rho-Vega | 10.26% | -0.68% | 6.13% | 10.87% | -14.43% | 27.48% | 9.53% | 12.97% |
| CVaR | 10.06% | -0.40% | 5.84% | 12.15% | -17.19% | 27.48% | 8.60% | 12.97% |
| Hierarchical CVaR | 10.43% | -0.20% | 5.73% | 12.13% | -20.09% | 27.48% | 8.59% | 12.97% |

| Portfolio | CVaR (c = 95%) | Mean Return | Stdev of Returns | MVO | Worst Return | Best Return | VaR (c = 95%) | Right CVaR (c = 95%) |
|---|---|---|---|---|---|---|---|---|
| No Hedge | 13.99% | -0.08% | 6.78% | 13.66% | -29.31% | 28.48% | 11.21% | 13.97% |
| Delta-Gamma | 8.49% | -2.08% | 4.81% | 4.00% | -12.15% | 36.53% | 7.75% | 10.61% |
| Delta-Rho-Vega | 11.38% | -2.81% | 5.73% | 3.60% | -15.43% | 24.99% | 10.49% | 11.14% |
| CVaR | 5.29% | -0.35% | 3.82% | 8.38% | -8.41% | 24.99% | 4.60% | 10.48% |
| Hierarchical CVaR | 5.30% | -0.36% | 3.78% | 8.25% | -8.45% | 24.89% | 4.60% | 10.39% |

FIG. 15
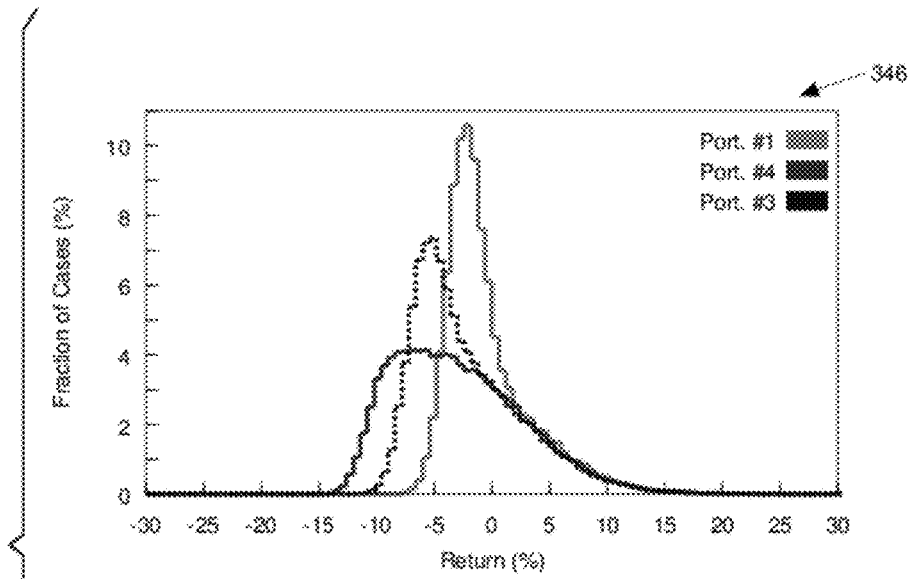
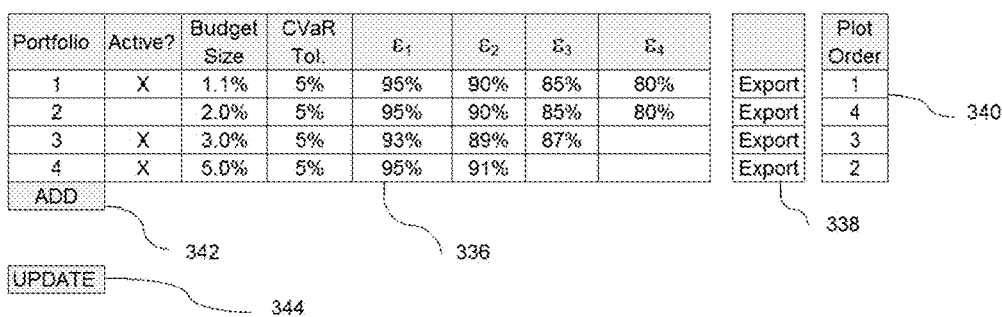

METHODS AND APPARATUS EMPLOYING HIERARCHICAL CONDITIONAL VALUE AT RISK TO MINIMIZE DOWNSIDE RISK OF A MULTI-ASSET CLASS PORTFOLIO AND IMPROVED GRAPHICAL USER INTERFACE

The present application is a continuation of and claims priority of U.S. patent application Ser. No. 15/280,144 filed Sep. 29, 2016, and claims the benefit of U.S. Provisional Application Ser. No. 62/333,563 filed May 9, 2016 both of which are incorporated by reference in their respective entireties.

RELATED APPLICATIONS

The present invention may advantageously be used in conjunction with one or more of the following applications and patents: U.S. patent application Ser. No. 11/668,294 filed Jan. 29, 2007 which issued as U.S. Pat. No. 7,698,202; U.S. patent application Ser. No. 12/958,778 filed Dec. 2, 2010 which issued as U.S. Pat. No. 8,533,089; U.S. patent application Ser. No. 12/711,554 filed Feb. 24, 2010 which issued as U.S. Pat. No. 8,315,936; U.S. patent application Ser. No. 12/827,358 filed Jun. 30, 2010; U.S. patent application Ser. No. 13/503,696 filed Apr. 24, 2012 which issued as U.S. Pat. No. 8,533,107; U.S. patent application Ser. No. 13/503,698 filed Apr. 24, 2012 which issued as U.S. Pat. No. 8,700,516; U.S. patent application Ser. No. 13/892,644 filed May 13, 2013; U.S. patent application Ser. No. 14/025,127 filed Sep. 12, 2013; U.S. patent application Ser. No. 14/051,711 filed Oct. 11, 2013; U.S. patent application Ser. No. 13/654,797 filed Oct. 18, 2012; U.S. patent application Ser. No. 13/965,621 filed Aug. 13, 2013; U.S. patent application Ser. No. 14/336,123 filed Jul. 21, 2014; U.S. patent application Ser. No. 14/203,807 filed Mar. 11, 2014; U.S. patent application Ser. No. 14/482,685 filed Sep. 10, 2014; U.S. patent application Ser. No. 14/495,470 filed Sep. 24, 2014; U.S. patent application Ser. No. 14/505,258 filed Oct. 2, 2014; U.S. patent application Ser. No. 14/519,991 filed Oct. 21, 2014; all of which are assigned to the assignee of the present application and incorporated by reference herein in their entirety.

FIELD OF INVENTION

The present invention relates generally to methods and apparatuses for constructing portfolios, overlay portfolios, and trade lists of multi-asset class investments that interactively manage and engineer the conditional value at risk (CVaR) of a portfolio or trade list at two or more confidence levels, as well as, to advantageous techniques for displaying two or more return distributions utilizing a graphical user interface. By specifying two or more confidence levels with a designated order of importance, herein termed hierarchical CVaR, investment portfolios and trade lists with advantageous return distributions may be engineered. An improved graphical user interface permits a portfolio manager or trader to readily create, display and select a preferred investment portfolio or trade list utilizing simultaneous displays of multiple distributions of returns to facilitate comparison with reduced impact from one return distribution's graphical display obscuring another.

BACKGROUND OF THE INVENTION

Multi-asset class portfolios are ubiquitous in finance. Asset managers, asset owners, and hedge-funds invest in diverse asset classes such as equities, fixed-income, commodities, foreign exchange, credit, derivatives, and alternative investments such as real estate and private equity. Large institutional investors such as pension funds, sovereign wealth funds, and university endowments have moved from portfolios composed of only equities and bonds to multi-asset class portfolios.

One overall aim of multi-asset class portfolio construction is to generate a diversified portfolio with a superior risk adjusted return. Multi-asset class instruments provide a more diversified set of asset allocation opportunities with a wide spectrum of risk and return profiles. For example, commodities tend to be negatively correlated with both equities and bonds. As a result, an investment portfolio holding commodities, equities, and bonds may have less risk than a portfolio invested in only equities and bonds due to the diversifying effect of the commodity investment.

The tools and methods used to construct multi-asset class portfolios must overcome obstacles not found when constructing equity-only portfolios. Many of these obstacles arise because the distributions of possible returns for non-equity investments are often highly asymmetric and can change substantially over time. The traditional Markowitz mean-variance optimization (MVO) framework, that linearizes the expected return of the portfolio and uses the standard deviation of return as a measure of risk, does not accurately measure risk for such portfolios. For asymmetric return distributions, downside risk, which is the risk or likelihood of the actual or realized return being less than the mean possible return, is often quite different than upside risk, which is the risk or likelihood of the actual or realized return being greater than the mean possible return. When constructing a portfolio of investments, an investor is usually principally interested in minimizing downside risk. The 2008-2009 financial crisis spurred a renewed interest in downside risk protection for multi-asset class portfolios because credit risk, a highly nonlinear non-equity class, played a major role in that crisis.

Consider the following investment situation that highlights some of the considerations in multi-asset class investing. A fixed income portfolio manager owns a large bond portfolio in early 2016. The U.S. Federal Reserve has indicated that it will reduce its quantitative easing program, which is likely to result in an increase in interest rates in the near future. Although an increase in interest rates will reduce the value of the existing bond portfolio, the manager does not want to change the portfolio. Instead, he or she wants to hedge it against future losses resulting from an increase in interest rates. The manager can do so by purchasing appropriate amounts of customized over-the-counter (OTC) derivatives such as interest rate caps and payer swaptions whose returns are strongly correlated with changes in the interest rates. These additional investments are often called overlay portfolios or simply overlays because they are added to an existing investment portfolio. The portfolio construction problem facing the manager requires: (a), deciding how to allocate an available budget towards the purchase of these overlays; (b), effectively hedging the portfolio against an increase in interest rates by determining the correct investment amounts in each of the overlay investments; and (c) satisfying the general set of constraints imposed for all the investments: namely, considerations, such as the manager's preferences and investment insights, business requirements, and institutional mandates.

Once a preferred overlay portfolio has been determined, the list of trades associated with that overlay must then be transmitted to an electronic trading system for execution.

As already indicated, one of the distinguishing features of multi-asset class portfolios, as compared with equity portfolios, is that the return distribution for multi-asset class portfolios is non-Gaussian and asymmetric with significant skew and kurtosis. For equity portfolios, the return distribution is symmetric and approximately Gaussian. An exemplary return distribution having these characteristics is illustrated by chart 200 of FIG. 1, which shows a return distribution 202 for one share in the S&P 500 Index, a well-diversified equity index. The distribution of possible returns 202 is approximately symmetric and Gaussian.

However, as shown in chart 204 in FIG. 2, the return distribution 206 for a covered call portfolio, which holds one share in the S&P 500 Index and is short one share (e.g., the same amount) of a call contract on the S&P 500 Index, is highly asymmetric and non-Gaussian. The non-Gaussian return profile of the covered call portfolio is due to the call contract, a nonlinear instrument with an asymmetric payoff. The upside of the covered call portfolio is capped by the strike price since the call will be exercised if the share price exceeds the strike. While the S&P 500 Index in isolation, as shown in distribution 202, has a significant probability of having returns as high as 20%, the highest possible return of the covered call 206 is only about 2.78%. The downside of the covered call portfolio is considerably greater than 2.78% since the share price of the S&P 500 Index can potentially go all the way to zero.

FIG. 3 shows a table 208 with several common risk metrics for the two return distributions 202 and 206 shown in FIGS. 1 and 2. One common measure of risk is the standard deviation of the possible returns. This metric is so ubiquitous in finance that it is often referred to as the "risk" of the investment. The higher the standard deviation, the riskier the investment. For the S&P 500 Index, the standard deviation of return is 6.48%, while for the covered call portfolio, it is only 3.78%. That is, using this metric of risk, the covered call is less risky than the S&P 500 investment in isolation.

One criticism of the standard deviation as a risk metric is that it fails to distinguish downside risk, the risk of a large, negative return, as shown by the left tails of distributions 202 and 206, from upside risk, the risk of a large, positive return, as shown by the right tails of the distributions 202 and 206. A second risk metric is conditional value at risk (CVaR) or expected shortfall, or left CVaR. This risk metric is a number that determines the likelihood or probability, at a confidence level & specified by the portfolio manager, that the realized loss will exceed the value at risk (VaR), which is an estimate of how much an investment might lose under typical market conditions over a specified time period. CVaR is a measure of the downside risk of the portfolio. As shown in table 208, for the S&P 500 Index portfolio, the CVaR is 13.45%, while for the covered call portfolio it is 10.55%. Hence, this measure of risk indicates that the covered call portfolio is less risky than the S&P 500 Index portfolio in isolation.

Table 208 also indicates the right CVaR, which is the expected excess return above the right VaR, which is the measure of the how much an investment might gain under typical market conditions over a specified period of time. That is, it measures the upside risk, the riskiness of the right tail of the distribution (the large positive returns) instead of the left tail (the large negative returns). As shown in table 208, the right CVaR of the S&P 500 is 13.31%, a value similar to the CVaR of this investment. These numbers are roughly the same because the overall distribution 202 is symmetric. However, for the covered call, the right CVaR is only 2.78%, which is substantially different and less risky than the left CVaR of 10.55%. This difference is caused by the substantial asymmetry of the return distribution 206 in which the range of possible positive returns is capped by the strike price.

Prior methods for constructing a portfolio of investments with advantageous risk and return characteristics are known. See, for example, Markowitz, in *Portfolio Selection: Efficient Diversification of Instruments*, Wiley, 1959 (Markowitz) which is incorporated by reference herein in its entirety, developed MVO, which is a portfolio construction approach and methodology that is widely used in equity portfolio management.

In MVO, a portfolio is constructed that minimizes the risk of the portfolio while achieving a minimum acceptable level of return. Alternatively, the level of return is maximized subject to a maximum allowable portfolio risk. In traditional mean variance portfolio construction, risk is measured using the standard deviation of possible returns. The family of portfolio solutions solving these optimization problems for different values of either minimum acceptable return or maximum allowable risk is said to form an efficient frontier, which is often depicted graphically on a plot of risk versus return. Portfolio construction procedures often make use of different estimates of portfolio risk, and some make use of an estimate of portfolio return. A crucial issue for these optimization procedures is how sensitive the constructed portfolios are to changes in the estimates of risk and return. Small changes in the estimates of risk and return occur when these quantities are re-estimated at different time periods. They also occur when the raw data underlying the estimates is corrected or when the estimation method itself is modified. Traditional MVO portfolios are known to be sensitive to small changes in the estimated asset return, variances, and covariances. See, for example, J. D. Jobson, and B. Korkei, "Putting Markowitz Theory to Work", Journal of Portfolio Management, Vol. 7, pp. 70-74, 1981 and R. O. Michaud, "The Markowitz Optimization Enigma: Is Optimized Optimal?", *Financial Analyst Journal*, 1989, Vol. 45, pp. 31-42, 1989 and *Efficient Asset Management: A Practical Guide to Stock Portfolio Optimization and Asset Allocation*, Harvard Business School Press, 1998, (the two Michaud publications are hence referred to collectively as "Michaud") all of the above cited publications are incorporated by reference herein in their entirety.

One of the assumptions of traditional MVO analysis is that the investment returns are approximately Gaussian since MVO uses the standard deviation of the portfolio returns to measure the risk of the portfolio. This standard deviation approach assumes that most of the asset variation falls within three standard deviations of the mean. For symmetric, returns distributions such as distribution 202, standard deviation is a useful measure of the risk of the portfolio. However for asymmetric return distributions, such as distribution 206, using the standard deviation as a risk measure can significantly understate the volatility or risk of the portfolio of nonlinear investments. This underestimation of risk is one of the principal deficiencies of traditional portfolio construction tools such as MVO when applied to portfolios with multi-asset class instruments and nonlinear return distributions.

For over three decades, commercial risk model vendors have sold factor risk models to estimate the standard deviation risk of a portfolio of assets. Alternatively, these same models may be used to estimate the variance of a portfolio, since variance is the square of the standard deviation. Such risk models can be advantageously employed to estimate return distributions. Factor risk models provide an estimate of the asset-asset covariance matrix, Q, which estimates the future covariance of each pair of asset returns using historical return data.

To obtain reliable variance or covariance estimates based on historical return data, the number of historical time periods used for estimation should be of the same order of magnitude as the number of assets, N. Often, there may be insufficient historical time periods. For example, new companies and bankrupt companies have abbreviated historical price data and companies that undergo mergers or acquisitions have non-unique historical price data. As a result, the covariances estimated from historical data can lead to matrices that are numerically ill-conditioned. Such covariance estimates are of limited value.

Factor risk models were developed, in part, to overcome these short comings. Factor risk models represent the expected variances and covariances of security returns using a set of M factors, where M is much smaller than N, that are derived using statistical, fundamental, or macro-economic information or a combination of any of such types of information. For each factor, every asset covered by the factor risk model is given a score. The N by M matrix of factors scores is called the factor exposures or factor loadings. In addition, a factor return is estimated for each factor at each time that the model is re-estimated. Given exposures of the securities to the factors and the covariances of factor returns, the covariances of security returns can be expressed as a function of the factor exposures, the covariances of factor returns, and a remainder, called the specific risk of each security. Factor risk models typically have between 20 and 200 factors. Even with, say, 80 factors and 1000 securities, the total number of values that must be estimated is just over 85,000, as opposed to over 500,000.

A substantial advantage of factor risk models is that since, by construction, M is much smaller than N, factor risk models do not need as many historical time periods to estimate the covariances of factor returns and thus are much less susceptible to the ill-conditioning problems that arise when estimating the elements of Q individually.

Over the many years that MVO and its variants have been commercially employed, a number of practices for constructing portfolios and trade lists using optimization have become standard. As one example, Axioma, Inc. (Axioma) sells software for constructing portfolios and trade lists that allows portfolio managers to construct portfolios and trade lists that specify general rules and requirements for both the portfolio and the trades. The portfolio can be long only, or it may be long-short. For long-short portfolios, the ratio or leverage between the market value of the short side can be controlled independently or as a function of the market value of the long side. The local universe comprising potential investment assets that may be used to construct the portfolio or trade list can be specified. General grandfathering options are commonly employed to allow the portfolio to hold or keep existing asset investments if they are not in the local universe or do not satisfy constraints that are violated by the initial holdings. In addition, the trade list may or may not allow cross-over (long positions becoming short positions or vice versa), and may or may not use round lotting to restrict the trade or holding sizes to multiples of a fixed numbers of shares. The strategy may also include compliance rules that are specified for subsets of portfolios.

The objective function, which may be minimized or maximized to obtain the optimal portfolio, may include linear terms such as the expected return or alpha. In MVO, the letter M refers to the mean and is a tilt on the expected return, sometimes called alpha, which is maximized for the optimal portfolio. The objective function may include tilts or linear terms for the long and short holdings separately. The objective function may include risk terms, which refer to the standard deviation of possible returns, or variance terms, which are the square of the standard deviations. These risk terms may be computed using the total holdings, or they may be computed using only the active holdings relative to a benchmark of investment holdings. In this case, the risk and variance terms are termed active risk or active variance. In MVO, the letter V refers to variance, either total or active, and is minimized. In many, if not most, cases, a commercial factor risk model is used to estimate the risk or variance of the portfolio. The objective function terms may also include the costs of trading the portfolio. Such costs may include both the costs charged directly as well as indirect market impact costs, such as changes in market prices caused by the trade itself. The objective function may also include terms designed to benefit the portfolio when taxes are considered. Taxable losses may be maximized while taxable gains—both short and long term and for various rates—may be minimized. In modern portfolio and trade list construction software, there is great flexibility to consider different, weighted combinations of these terms in the objective function to compute a desired, optimal portfolio.

The portfolio construction strategy will usually include a set of constraints that must be satisfied by the optimal portfolio or trade list. These constraints may include maximum and/or minimum bounds on the holdings or exposures of the holdings. For instance, the maximum and minimum asset weights in the portfolio may be specified. Or the maximum or minimum net exposure of assets to an industry, sector, or country may be specified. The maximum and minimum net exposure of the portfolio or subsets of the portfolio to general attributes such as market capitalization or average daily traded volume may also be specified as constraints on the portfolio or trade list. Instead of including risk or variance in the objective function, the maximum allowable risk, active risk, variance, or active variance may be specified as a constraint. In addition, the marginal contribution to risk or active risk, which is the derivative of the risk with respect to an asset's weight in the portfolio, may also be given a maximum value. The constraints may impose limits on the kinds and size of trades employed. That is, some assets may not be allowed to trade, while other asset positions may be entirely liquidated. The total transaction cost of trades may be constrained to be less than a maximum allowable amount. The total number of names held or traded may also be constrained. The taxable gains and liabilities for the investment holdings may be constrained.

Of course, with more sophisticated software, the number and variety of possible objective terms and constraints increases.

The various combinations of the above listed objective terms and constraints comprise the typical requirements of a portfolio or trade list construction strategy. These are the general preferences and investment insights, business requirements, and institutional mandates that must be satisfied by a portfolio manager when constructing a portfolio, overlay, or trade list.

The commercial importance and expertise required to build high quality factor risk models, as well as, high quality portfolios and trade lists has led to many patented innovations for factor risk models. These include U.S. Pat. Nos. 7,698,202, 8,315,936, 8,533,089, 8,533,107, and 8,700,516, all of which are assigned to the assignee of the present invention and are incorporated by reference herein in their entirety.

There are numerous, well known, variations of MVO that are used for portfolio construction. These variations include methods based on utility functions and the Sharpe ratio.

Having recognized that standard deviation can be a poor measure of risk for multi-asset class portfolios, there has been considerable interest in downside risk measures that reflect the financial risk associated with losses. There have been two primary downside risk measures that have been proposed and studied: value at risk (VaR), and conditional value at risk (CVaR) which is also known as expected shortfall or left CVaR.

Value at risk (VaR) estimates how much a set of investments might lose under typical market conditions over a fixed time period such as a day. VaR is calculated as a threshold loss value such that the probability that the loss on the portfolio over the given time horizon exceeds a given confidence limit or probability. So, for example, a portfolio VaR of ten million dollars at a 95% confidence level over a ten day period indicates that there is 95% confidence that the portfolio will not suffer losses greater than ten million dollars over a ten day period.

VaR played a prominent role in the Basel regulatory framework. See, for example, A. J. McNeil, R. Frey, and P. Embrechts, Quantitative Risk Management: Concepts, Techniques, and Tools, Revised Edition, Princeton University Press, 2015, (McNeil), which is incorporated by reference herein in its entirety. VaR is the most widely used risk measure for multi-asset class portfolios.

The conditional value at risk (CVaR) at a confidence level & is the expected value of the loss exceeding VaR. CVaR is an alternative to VaR that is more sensitive to the shape of the loss distribution in the tail of the distribution. CVaR was introduced to overcome the shortcomings of VaR. In certain contexts, VaR has poor mathematical properties. It is not coherent in the framework of P. Artzner, F. Delbaen, J. M. Eber, and D. Heath, "Coherent Measures of Risk," *Mathematical Finance*, 9(3), pp. 203-228, which is incorporated by reference herein in its entirety. In particular, it is not sub-additive. In other words, the VaR of a portfolio can be larger than the sum of the VaR of the portfolio constituents. So, if VaR is used to set risk limits, it can lead to concentrated portfolios. CVaR, on the other hand, is a coherent risk measure encouraging diversification.

VaR does not measure the left tail of the portfolio loss distribution. Consequently, the worst case loss can be much larger than VaR. CVaR, on the other hand, is a tail statistic that incorporates the losses that occur in the left tail of the loss distribution.

VaR for a nonlinear portfolio is difficult to optimize in practice as it requires the solution to a non-convex optimization problem. CVaR, on the other hand, can be optimized via a scenario based linear program. This follows from the work of R. T. Rockafellar and S. Uryasev, "Optimization of Conditional-Value-at-Risk," *Journal of Risk*, 2(2000), pp. 493-517 and R. T. Rockafellar and S. Uryasev, "Conditional Value-at-Risk for General Loss Distributions," *Journal of Banking & Finance*, 26(2002), pp. 1443-1471, (these two Rockafellar-Uryasev publications are hence referred to collectively as "Rockafellar-Uryasev"), both of which are incorporated by reference herein in their entirety.

Although this prior art portfolio and trade list construction approach can be solved using linear programming, it has important limitations. The method is particularly sensitive to estimation errors in the scenarios or Monte Carlo simulations. When employing this prior art approach, it is unclear whether the optimization procedure is minimizing CVaR or the estimation error embedded in the CVaR estimate or a combination of both (Michaud).

In addition, in practice, many portfolio and trade list construction problems that minimize CVaR result in an objective function to be minimized with relatively flat gradients. Hence, although a global optimal solution may exist that minimizes CVaR, there may be alternative portfolios or trade lists that have nearly the same CVaR. Existing approaches that minimize CVaR do not take advantage of the fact that there may exist alternative portfolios or trade lists with nearly optimal CVaR risk estimates as well as other advantages.

Other downside risk measures have also been proposed, but these have significant deficiencies compared with CVaR. There has been prior research to improve the risk estimates and avoid the underestimation caused by using the standard deviation by incorporating higher moments such as skew and kurtosis in the portfolio construction. Mathematically, the standard deviation is the second moment of the distribution of returns, while skew and kurtosis are the third and fourth moments of the distribution of returns. See E. Jondeau and M. Rockinger, "Optimal Portfolio Allocation Under Higher Moments," *European Financial Management*, 12(1), 2006, pp. 29-55, which is incorporated by reference herein in its entirety.

However, approaches that incorporate higher order moments in their measure of risk have a number of deficiencies. First, these approaches are limited in the size of the portfolios that they can handle. Second, these approaches require a long return time series to estimate the third and the fourth moments. This data may not be available; even if the data is available, the estimates often include significant estimation errors. Third, the portfolio construction problem is a non-convex polynomial optimization problem that cannot be solved efficiently in practice.

Semivariance and lower partial moments have also been proposed as measures of downside risk. However, there is no practical approach to minimize either semivariance or lower partial moments when constructing a portfolio, overlay or trade list.

SUMMARY OF THE INVENTION

Among its several aspects, the present invention recognizes that existing approaches for strategically constructing portfolios and trade lists comprising multi-asset class investments suffer from important limitations as addressed in detail above and further below.

One general problem considered by the present invention is how to more effectively allocate a budget towards purchase of overlays, hedge the portfolio and satisfy the general constraints imposed on the portfolio. Particular attention is paid to hedging market risk and credit risk; that is, reducing the risk of a portfolio associated with market risk or credit risk. Market risk is the risk of a change in the value of a portfolio due to changes in the value of its holdings, for example, changes in the market value of an existing portfolio. Credit risk is the risk of not receiving promised payments due to default of the counterparty in investments such as credit default swaps.

A further significant aspect of the present invention concerns a graphical user interface that can easily and automatically alter the manner in which return distributions such as distributions 202 and 206 are displayed. In several aspects of the present invention, improved ease of interaction between a portfolio manager and a graphical user interface is addressed. In some embodiments of the invention, an iterative interaction occurs between the portfolio manager and a graphical user interface in order to construct and select a portfolio whose distribution of potential returns has desirable properties. Those desirable properties are advantageously displayed on the graphical user interface as addressed further herein.

The present invention recognizes that traditional portfolio construction tools that use standard deviation as a risk measure can significantly underestimate risk when assets with nonlinear and asymmetric returns distributions are included in the portfolio. Such underestimation is commonly the case for multi-asset class portfolios, and it is an important limitation of traditional portfolio construction tools. When portfolios, hedges, and trade lists are constructed for multi-asset class securities, the likelihood of underestimating the risk of the portfolio is high. In other words, a hedge produced using standard deviation as the risk metric may not reduce risk as much as the standard deviation metric suggests The present invention recognizes that portfolio construction and trade list construction approaches that minimize VaR have significant limitations. These include a lack of mathematical coherence as well as mathematical and practical difficulties in determining portfolios or trade lists that minimize VaR.

The present invention recognizes that among the different measures of downside risk that have been proposed, CVaR has many advantages. These advantages include mathematical coherence, its focus on the left tail of the distribution of returns describing losing returns, and practical solution techniques.

Although portfolio construction techniques that minimize CVaR exist in the prior art, there are a number of limitations to these existing approaches. These include the fact that the traditional linear programming solution is sensitive to estimation error and the fact that the objective function for many practical problems that minimize CVaR are nearly flat objective functions.

The present invention recognizes that existing efforts to improve portfolio construction tools for portfolios with nonlinear and asymmetric return distributions by including higher order moments such as skew and kurtosis are often not satisfactory since they lead to non-convex polynomial optimization problems that cannot be efficiently solved in practice.

The present invention also recognizes the limitations in how two or more distributions of returns are displayed. When two or more distributions are plotted simultaneously, each distribution must be displayed either on top of or behind each of the other distributions. As a result, the distributions plotted on top of other distributions potentially hide or obscure the distribution results for those distributions plotted behind them. Such obscuration may make it difficult to easily compare the distributions or decide if one has better properties than the other.

One goal of the present invention, then, is to provide a methodology that enables a portfolio manager to effectively construct a portfolio with superior downside risk properties. In particular, the portfolio is constructed so that the CVaR is minimized for two or more specified confidence levels.

Another goal is to provide improved tools for displaying and comparing the predicted performance for alternative portfolios.

Another goal is to provide an improved, interactive tool in a graphical user interface for use by a portfolio manager who wishes to manage and minimize the CVaR of his or her portfolio at several confidence levels.

Another goal is to provide an improved, interactive tool embedded in an electronic trading system so that a portfolio manager who wishes to manage and minimize the CVaR of his or her portfolio may efficiently and interactively construct a desirable hedge and transmit and trade that hedge on the electronic trading platform.

According to one aspect of the present invention, downside risk is measured using CVaR. Multi-asset class portfolios are constructed by minimizing the CVaR of the portfolio using an improved methodology based on the Rockafellar-Uryasev approach modified as taught herein and employed in conjunction with a Monte-Carlo framework to generate the asset return scenarios for the multi-asset class investment opportunities.

In one aspect of the present invention, improved tools for simplifying and improving interactions between a portfolio manager and a graphical user interface are provided. In some embodiments of the invention, the invention embodies an interactive tool embedded within a window of a graphical user interface which is used by the investment manager to interactively alter various test portfolios in order to construct and select a preferred portfolio whose distribution of potential returns has desirable properties.

In other embodiments of the invention, the invention embodies an interactive tool embedded within an electronic trading platform which is used by the investment manager to interactively construct a set of trades which alters the distribution of potential returns so that they have desirable properties.

The present invention describes new and improved methods for: (a), modeling the possible performance of multi-asset portfolios, overlays, and trade lists; (b), constructing portfolios and trade lists that minimize the downside risk of the portfolio, overlay, or trade list; (c) iteratively and efficiently interacting with a graphical user interface so that the differences in the performance of different portfolios, overlays, and trade lists can be quickly and accurately compared and a preferred portfolio, overlay or trade list can be engineered and identified; and (d), efficiently transmitting a preferred portfolio, overlay or trade list to a portfolio database or electronic trading system.

To such ends, a computer-implemented method for interactively comparing performance of a plurality of investment portfolios within a window of a graphical user interface is provided. The method may suitably comprise: electronically receiving by a programmed computer a plurality of return distributions corresponding to the plurality of investment portfolios wherein each return distribution comprises pairs of return and frequency values; displaying a graphical representation of the return distribution for each investment portfolio within a first window of the graphical user interface on a computer screen in a display order such that a second return distribution is displayed over and potentially obscures a first return distribution; monitoring, by a processor, a location of a user pointer to detect when the user pointer is located and hovering within the window of the graphical user interface displaying the first and the second distributions; automatically determining an indicated return value corresponding to the return value of the first and second return distributions whenever the user pointer is located and hovering within the graphical user interface displaying the first and second return distributions; and automatically altering, by the processor, the order in which the first and second return distributions are displayed so that, at the indicated return value corresponding to the user pointer location, no return distribution completely obscures any other return distribution.

According to a further aspect of the invention, each of the plurality of investment portfolios are constructed to minimize a conditional value at risk (CVaR) at more than one confidence limit.

A more complete understanding of the present invention, as well as further features and advantages of the invention, will be apparent from the following Detailed Description and the accompanying drawings.

BRIEF DESCRIPTION OF THE DRAWINGS

FIG. 15 shows a representative portfolio construction graphical user interface employing the invention;

DETAILED DESCRIPTION

Figure 6:
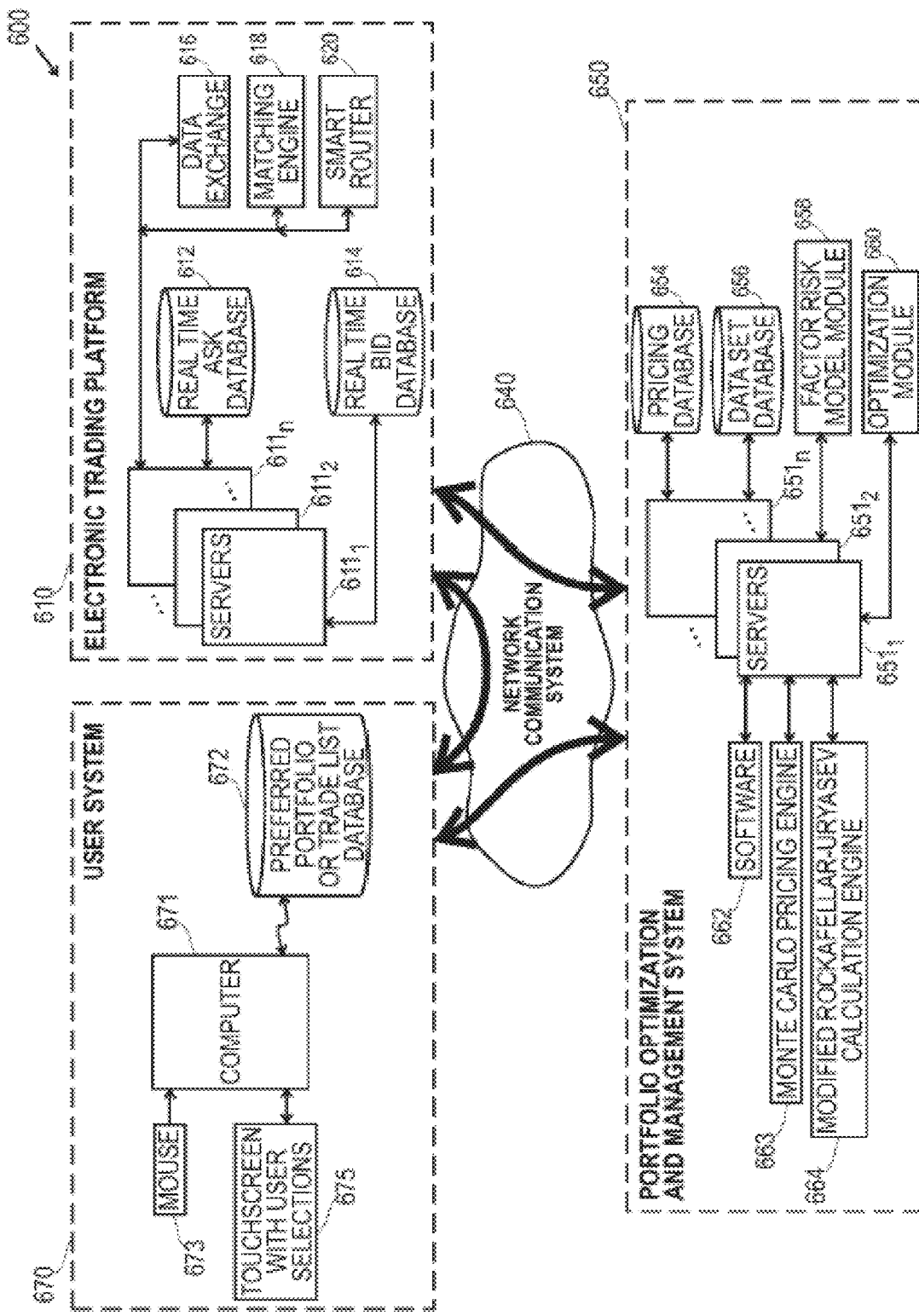
FIG. 6 shows an overall system embodying aspects of the present application.

The present invention may be suitably implemented as a networked computer based system, such as networked system 600 of FIG. 6, in computer software which is stored in a non-transitory manner and which may suitably reside on computer readable media, such as solid state storage devices, such as RAM, ROM, or the like, magnetic storage devices such as a hard disk or solid state drive, optical storage devices, such as CD-ROM, CD-RW, DVD, Blue Ray Disc or the like, or as methods implemented by such systems and software. The present invention may be implemented on personal computers, workstations, computer servers or mobile devices such as cell phones, tablets, IPads™, IPods™ and the like, as well as networked connections of such devices which are preferably optimized to rapidly perform the large number of computations on very large data sets employed in various contexts in which the present invention appears most likely to be employed.

Figure 1:
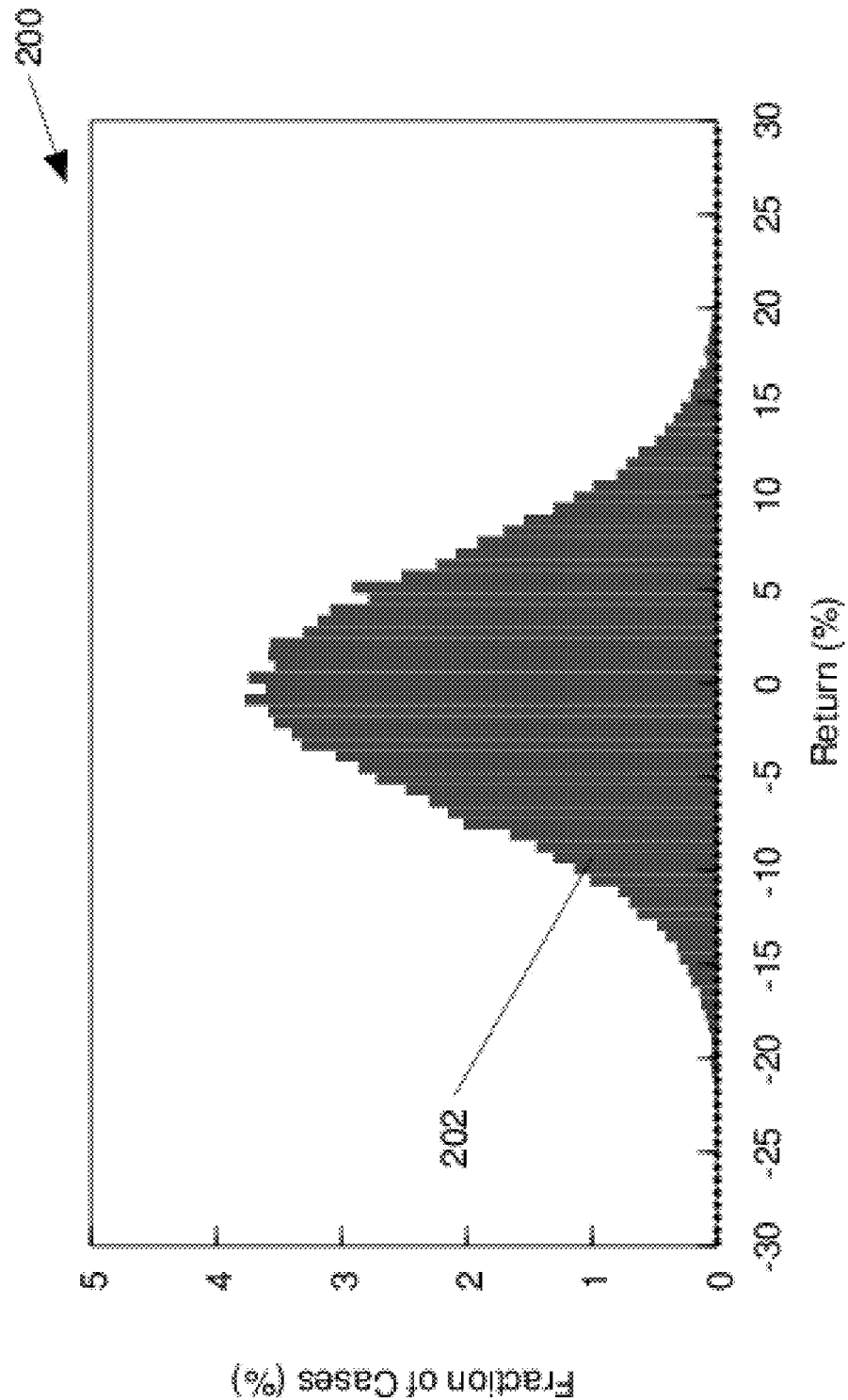
FIG. 1 shows a possible return distribution for one share of the S&P 500 Index to illustrate an aspect of the Background of the Invention.
Figure 2:
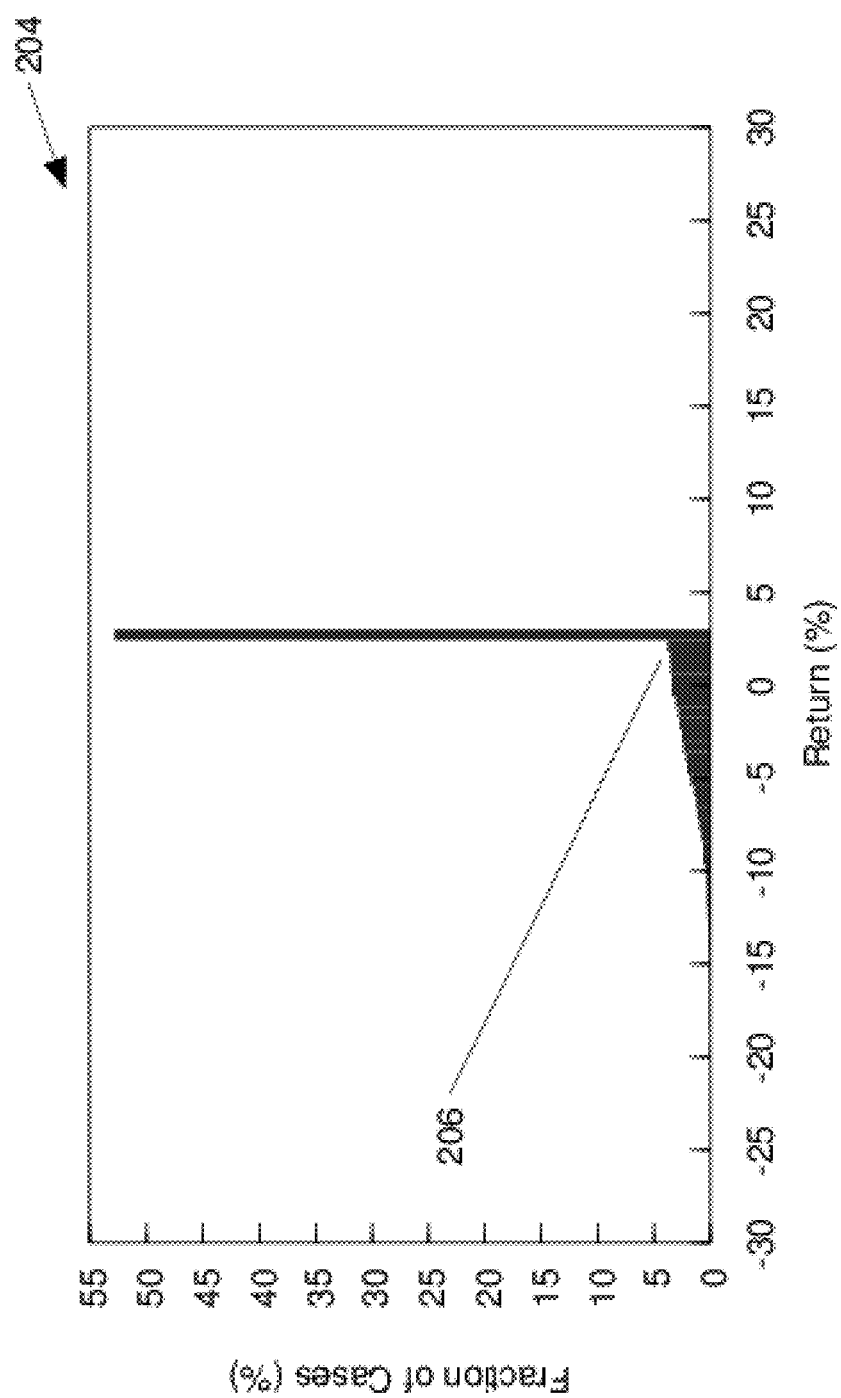
FIG. 2 shows a possible return distribution for a covered call portfolio composed of one share of the S&P 500 Index and a short of one share of a call on the S&P 500 Index to illustrate an aspect of the Background of the Invention.
Figure 3:
FIG. 3 shows a table of different risk metrics for the S&P 500 Index and the covered call portfolio to illustrate an aspect of the Background of the Invention.
Figure 4:
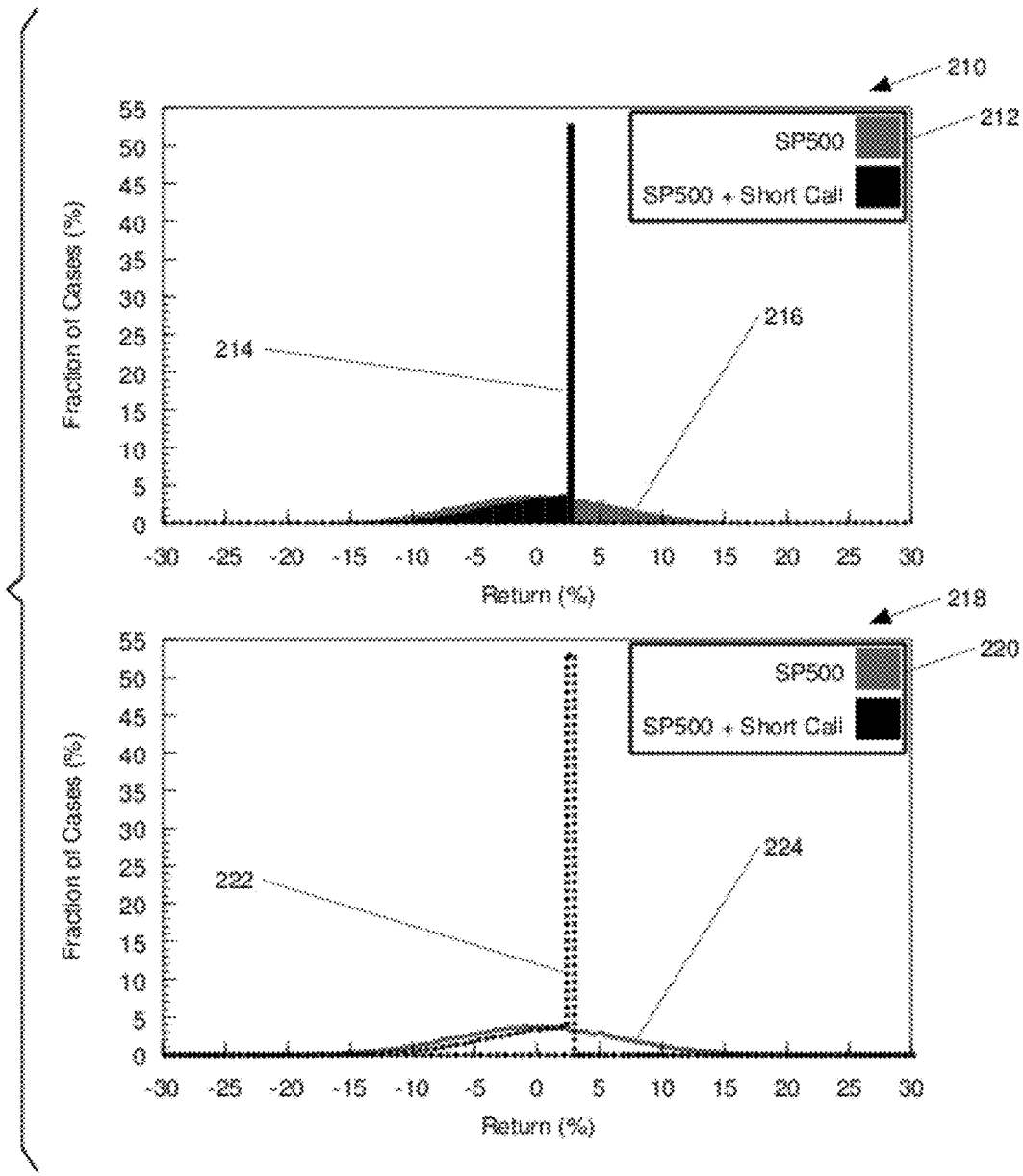
FIG. 4 shows two different charts simultaneously displaying the two return distributions shown in FIGS. 1 and 2.

The charts 210 and 218 in FIG. 4 show two possible display formats for simultaneously displaying return distributions, such as the return distributions 202 and 206 of FIGS. 1 and 2. In upper chart 210, the distributions are shown using filled-in, colored bars. The legend 212 indicates that light gray is used to represent the return distribution of the S&P 500 Index. The return distribution 216 in FIG. 4 is identical to distribution 202 in FIG. 1. The legend 212 indicates that dark gray is used to represent the return distribution of the covered call composed of the S&P 500 Index and the short call. The return distribution 214 in FIG. 4 is identical to distribution 206 in FIG. 2.

As can be seen in chart 210, one of the advantages of displaying more than one return distribution on the same chart is that the scale of the returns can be more easily compared. In this case, it is quite evident that the most likely return of the covered call 214 is 2.78% since such a return occurs more than half the time. However, one of the disadvantages of this approach is that one return distribution hides or obscures the other. In the chart 210, since distribution 214 is drawn on top of distribution 216, it potentially obscures the differences between the two return distributions. For example, in chart 210, it is hard to know what the return distribution 216 does for small positive returns because its light gray bars are hidden by the dark gray bars of distribution 214.

Note that in chart 210, the order in which the two return distributions have been plotted matters. As shown in chart 210, with distribution 214 plotted in front of distribution 216, most of both distributions are visible. If, however, the order had been reversed and distribution 216 had been plotted in front of distribution 214, then virtually the entire left part of distribution 214 would have been hidden by distribution 216. Such a plotting order would be notably inferior to the order shown in chart 210. As addressed further herein, one aspect of the invention allows the user to readily select and change this order. According to another aspect, automatic processes and apparatus are provided to insure an advantageous order of plotting.

One potential solution to having one distribution hide a second distribution is shown in lower chart 218 of FIG. 4. In this representation, only the tops of the bars of chart 214 are shown. The legend 220 in 218 uses the same colors as in legend 212, namely light gray for the S&P 500 Index investment, dark gray for the covered call. The outline of the S&P 500 return distribution 224 is shown by the light gray line. The outline of the covered call return distribution 222 is shown by the dark gray line. This representation greatly reduces the possibility of not being able to see a distribution. However, as can be seen, when the two lines overlap, as they do for small positive returns, there is still the possibility that the thickness of the line may hide the details of the distribution.

When there are more than two distributions being shown, the visual ability to see and distinguish the distributions is potentially further reduced, as there is more chance of one overlapping and hiding the other. Also, there are simply too many lines on the chart to facilitate easy user comparison of the differences in the returns.

Figure 5A:
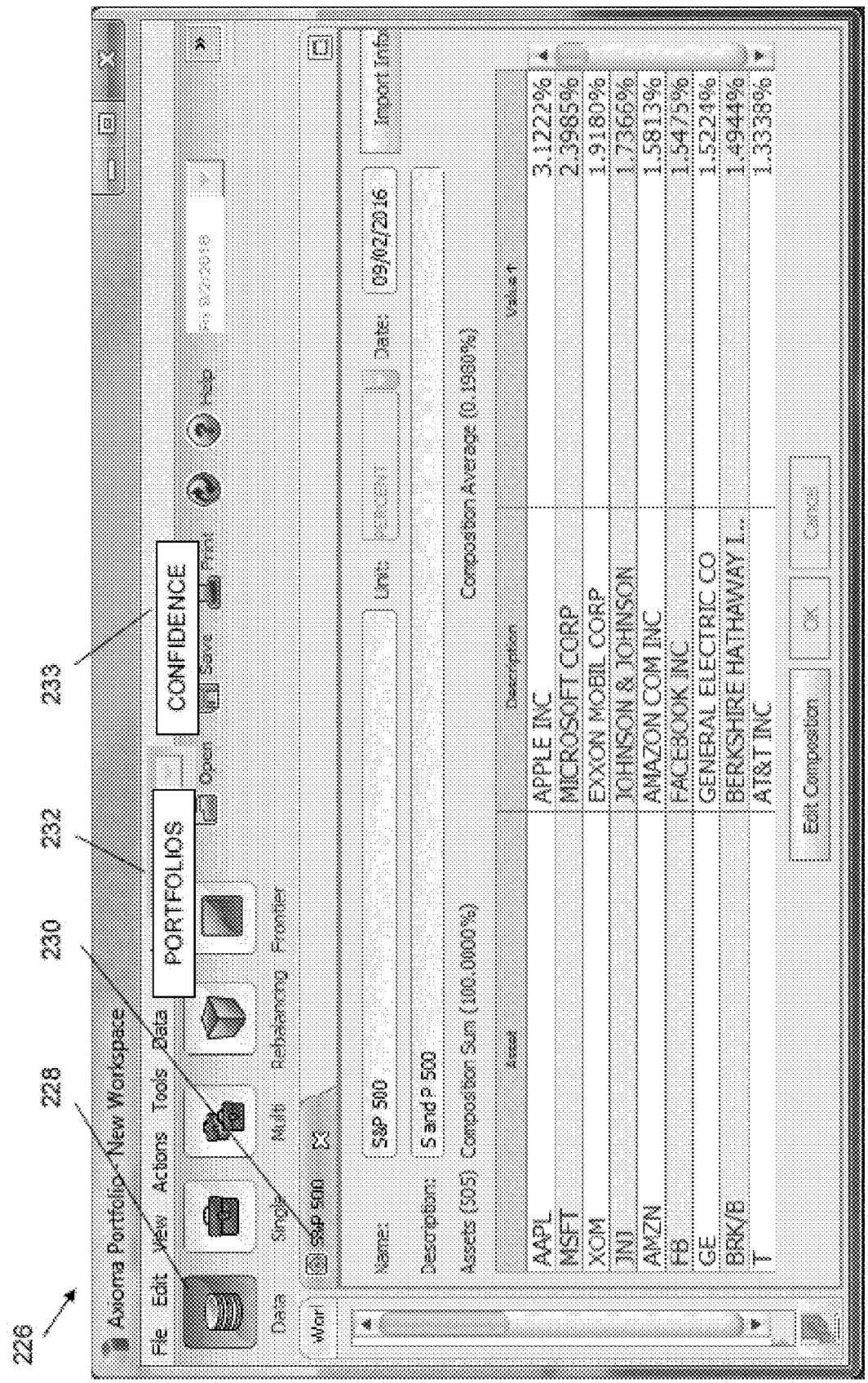
FIG. 5A shows an illustrative screenshot produced by portfolio construction graphical interface software including a table of portfolio statistics which may be suitably employed as a source of investment portfolios and the like for use in conjunction with the present invention.

FIG. 5A shows a screenshot 226 produced by a portfolio construction graphical user interface software, such as the Axioma Portfolio Optimizer™ software, modified to operate in conjunction with the present invention. The graphical user interface includes buttons or user indicators 228 and 230 that may be selected by the user using a mouse, keyboard or other user control device. When the button 228 is selected with a mouse click, keyboard keystroke, or a touch of a touchscreen icon, the graphical user interface displays the "Data" perspective of the program. When the tab 230 is selected, the graphical user interface brings this tabbed window to the front of all windows in the display. In screenshot 226, only one window is shown for clarity, but users may open dozens of windows simultaneously and toggle back and forth between them with appropriate use of the graphical user interface tools.

FIG. 5A includes two menu selectors, 232 and 233. When menu selector 232 is selected, the graphical user interface displays a list of portfolios that can be displayed in the main window. By clicking on selector 232, a drop down menu of portfolios is displayed. Then, the user can choose which portfolio or portfolios are under analysis using the selection menu. When selector 233 is selected, the user is presented with a drop down menu of different confidence levels to select from. Once a portfolio is selected with selector 232 and one or more confidence levels are selected using selector 233, an optimized hedge is found by the software.

Screenshot 226 includes selectors 232 and 233 to provide a user selection tool to select portfolios or hedges from a drop down menu consistent with the devices addressed in FIGS. 8-15 and to specify confidence levels $\varepsilon_1, \varepsilon_2, \ldots \varepsilon_n$, respectively. The data in screenshot 226 is in tabular form. In the window 230, the properties of a portfolio of investments are shown including columns displaying the Asset, Description, and Value. While such graphical user interfaces are common, enhanced interaction between the user and the interface is an important aspect of the present invention. In some embodiments of the invention, the invention is embodied as an interactive tool embedded within a window of a graphical user interface which is used by the investment manager to interactively alter various portfolios in order to construct and select a preferred portfolio whose distribution of potential returns has desirable properties as addressed further below.

Figure 5B:
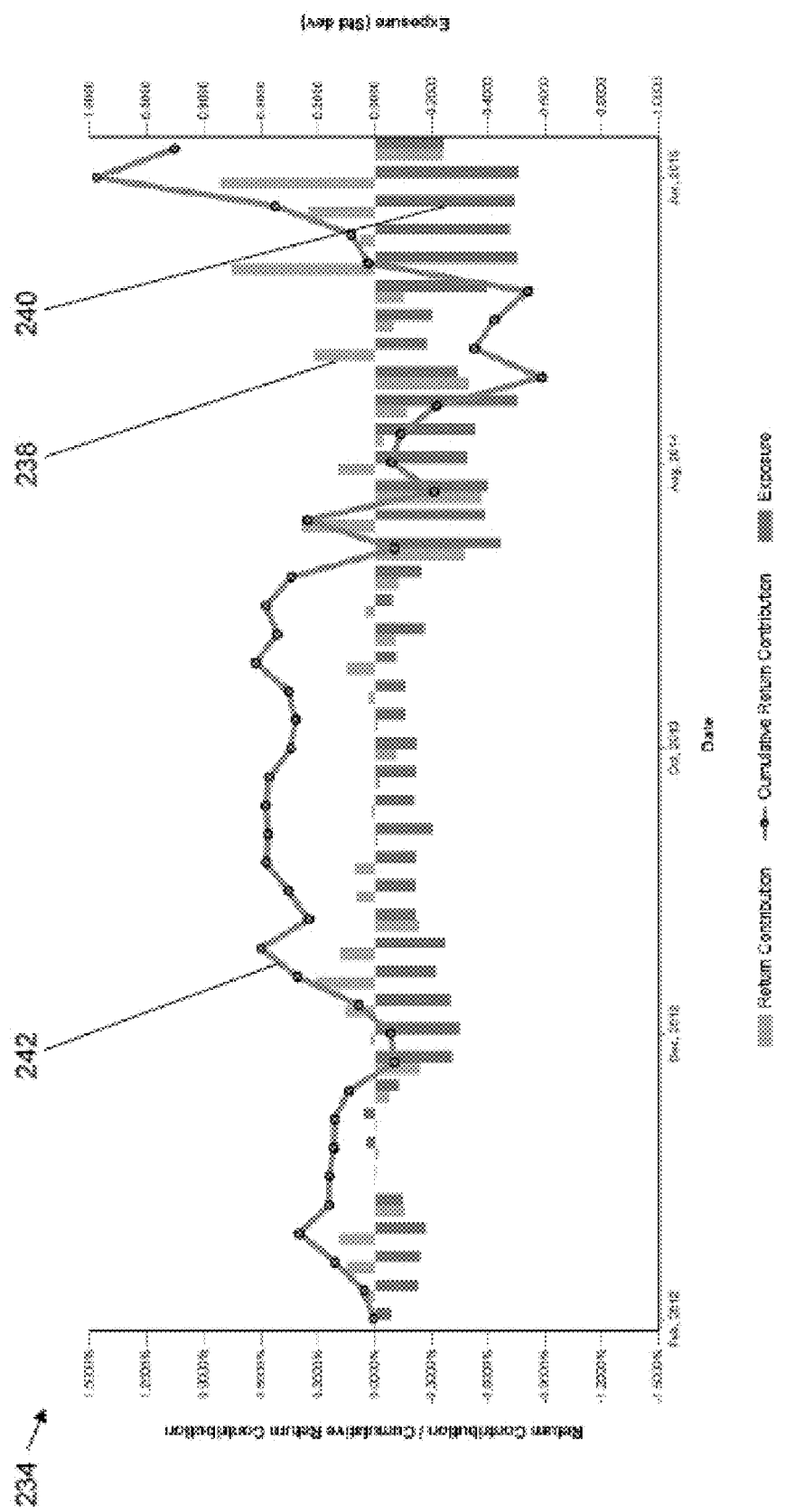
FIG. 5B shows an illustrative screenshot produced by portfolio performance attribution software including bar and line charts adapted for use in conjunction with the present invention.

FIG. 5B shows a second screenshot 234 produced by Axioma's performance attribution graphical user interface software, Axioma Portfolio Analytics™, adapted to add improved functionality as discussed further below. In the chart, there are two sequences of colored bars 238 and 240, respectively, each sequence representing time series of exposures and returns associated with an investment portfolio. Alternatively, the cumulative return is represented by a graphical line 242 extending across the window.

In short, then, the graphical user interface associated with financial investment portfolios commonly employ user indicators that control the manner in which both tabular and graphical data are displayed in the graphical user interface.

Customized hardware and software to improve the interaction between a portfolio manager and an electronic trading platform is one aspect of the present invention. As further illustrated in one embodiment of the present invention shown in FIG. 6, further customized hardware and software are addressed herein. FIG. 6 shows a networked system 600 in which an electronic trading platform 610 communicates utilizing a network communication system 640 with a portfolio optimization and management system 650 and a user system 670 used by a portfolio manager or the like. The electronic trading platform 610 may receive bids and asks directly from a trader utilizing user system 670 or through the system 650. Individual investors and traders buy or sell securities, foreign exchange, and other financial derivative products over the electronic trading platform 610. Exemplary electronic trading platforms, such as NASDAQ, NYSE Arca, Globex, London Stock Exchange, BATS, Chi-X Europe, TradeWeb, ICAP, and Chicago's Board of Trade, provide virtual marketplaces comprising an information technology infrastructure for buyers and sellers to bid for and sell financial instruments. A trader submits a bid to the electronic trading platform via an electronic terminal such as the computer 671 having a graphical user interface as described further herein. The electronic trading platform 610 maintains databases 612 and 614 of real time ask and bid information and also transmits real-time asking and bidding information that reflects pricing information of a financial instrument via the communication network 640. While a single user computer 671 with a graphical user interface is shown for ease of illustration, it will be recognized that an electronic trading platform such as the platform 610 typically communicates with a large number of computer terminals of a large plurality of different trading entities. The user system 670 also comprises a mouse 673 as well as a touch screen 675 displaying user selectors, such as selectors 232 and 233 addressed above in connection with FIG. 5A.

The market data transmitted by the electronic trading platform may include quotations, last trade feeds, and/or other market information. The electronic trading platform 610 may also suitably communicate with any kind of exchange, market data publisher, alternative trading system, electronic communication network (ECN), dark pool, and/or the like. The electronic trading platform 610 may comprise a data exchange 616 that may execute a trading order. The electronic trading platform may further comprise a matching engine 618 and a smart router 620 that suitably operate to match, route and/or re-route any orders to one or more data exchanges, which may be affiliated with the affiliated with the electronic trading platform, or located at another electronic trading platform.

Portfolio managers of all types may participate in electronic trading of investment positions over the electronic trading platform 610. For example, high frequency trading (HFT) participants may take advantage of the present invention to execute preferred hedges. Other portfolio managers may include any broker, individual investor, or other trading entity, who enjoy data transmission capability at an electronic trading platform.

An interaction between an electronic trading platform 610 and a portfolio manager user system 670 may be similar to the interaction that may occur between a portfolio manager and a graphical user interface. A number of different portfolios may be evaluated, and strategies for employing quantitative metrics that describe the advantages of each portfolio must be compared. The quantitative metrics may change as real-time updates of price information and the like are obtained from the electronic trading system. When more than one portfolio or trade list is considered, a decision must be made identifying a final decision on the portfolio or trade list to use. Then, the preferred trade list must be transmitted to the electronic trading platform to be executed. Alternatively, once a preferred portfolio or trade list is identified, it may be transmitted to a database 672 for storage.

As one example of how a portfolio manager may suitably develop a portfolio or trade set, the user system 670 is used to communicate through the communication network 640 with a portfolio optimization and management system 650. System 650 comprises plural high speed servers $652_1$, $652_2, \ldots, 652_n$, a pricing database 654, a dataset database 656, a factor risk model module 658, an optimizer module 660 and software 662 to construct portfolios and trade lists from inputs provided by the portfolio manager. In the present invention, the software 662 operates in conjunction with a Monte Carlo pricing engine 663 to compute an optimized portfolio or trade list that minimizes CVaR and to solve second-order cone (SOCP) problems utilizing a modified Rockafellar-Uryasev solution engine 664 and method. While various modules and engines discussed above may be implemented in software operating on a processor or server, it will be recognized that they may be implemented as a combination of software and hardware or principally as hardware, such as an array of field programmable arrays (FPGAs) or application specific integrated circuits (ASICs).

Figure 7:
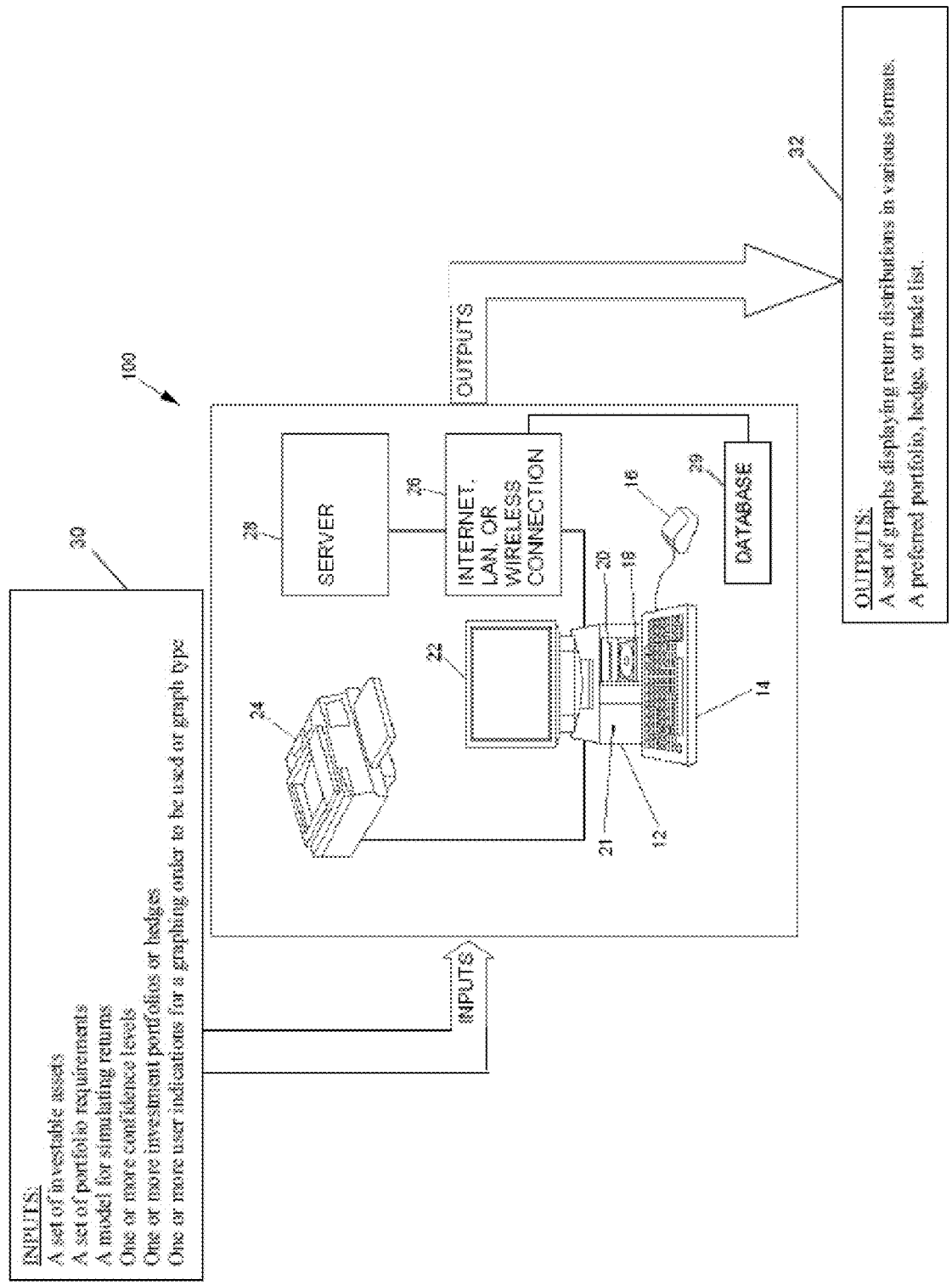
FIG. 7 shows a user computer system which may be suitably utilized in conjunction with the present invention and suitable for use in the overall system of FIG. 6.

FIG. 7 shows a block diagram of a computer system 100 which may be suitably employed as one implementation of the user system 670 of FIG. 6 and used to implement aspects of the present invention. System 100 is implemented as a desktop computer or a mobile computing device 12 including one or more programmed processors, such as a personal computer, workstation, or server. One likely scenario is that the system of the invention will be implemented as a personal computer or workstation that connects to a server, database, or an electronic trading system 28 like electronic trading platform 610, as well as other user computers through an Internet, local area network (LAN) or wireless connection 26. The server, database, or electronic trading system 28 or LAN 26 may also connect to a portfolio optimization and management system, such as system 650 of FIG. 6, or a database that stores and manages investment portfolios. In this embodiment, both the computer or mobile device 12 and server, database, or electronic trading system 28 run software that when executed enables the user to input instructions, user indications, and calculations in accordance with the present invention as described further herein to be performed by the computer or mobile device 12, send the input for conversion to output at the server, database, or electronic trading system 28, and then display the output on a graphical user interface display, such as display 22, or print the output, using a printer, such as printer 24, connected to the computer or mobile device 12. The output could also be sent electronically through the Internet, LAN, or wireless connection 26. In another embodiment of the invention, the entire software is installed and runs on the computer or mobile device 12, and the Internet connection 26 and server, database, or electronic trading system 28 are not needed.

As shown in FIG. 7 and described in further detail below, the system 100 includes software that is run by the central processing unit of the computer or mobile computing device 12. In one embodiment, system 100 employed as the user system 670 communicates with an optimization and management system, such as system 650, to license and download application software to perform the processes and analyses described further below. A file transfer protocol (FTP) high speed download transfer site is established and the software is downloaded from the system 650. This software customizes the system 100 and transforms the system into a special purpose computer providing unique functionality as addressed further herein. The computer or mobile device 12 may suitably include a number of input and output devices, including a keyboard 14, a mouse 16, CD-ROM/CD-RW/DVD drive 18, disk drive or solid state drive 20, monitor 22 which may be a touchscreen, and printer 24.

The mouse 16 and keyboard 14 can be used to provide user indications to be displayed on and selectors to be acted upon utilizing the graphical user interface display 22 and monitored by the computer or mobile device 12 as addressed further below in connection with the discussion of FIG. 17. For mobile devices and other suitable devices, the user indications or selectors may be input using a touch-screen display. In addition, the server, database, or electronic trading system 28 or LAN 26 or electronic trading system or portfolio database may also monitor the interaction with the graphical user interface 22, respond to user indications from the mouse 16 or keyboard 14, touchscreen, and so on.

The computer or mobile device 12 may also have a USB connector 21 which allows external hard drives, flash drives and other devices to be connected to the computer or mobile device 12 and used when utilizing the invention. It will be appreciated, in light of the present description of the invention, that the present invention may be practiced in any of a number of different computing environments without departing from the spirit of the invention so long as the transformative aspects of the present invention are employed therein. For example, the system 100 may be implemented in a network configuration with individual workstations connected to a server as discussed further above in connection with FIG. 6. Also, other input and output devices may be used, as desired. For example, a remote user could access the server with a desktop computer, a laptop utilizing the Internet or with a wireless handheld device such as cell phones, tablets and e-readers such as an IPad™, IPhone™, IPod™, Blackberry™, Treo™, or the like.

One embodiment of the invention has been designed for use on a stand-alone personal computer running Windows 7. Another embodiment of the invention has been designed to run on a Linux-based server system. The present invention may be coded in a suitable programming language or programming environment such as Java, C++, Excel, R, Matlab, Python, etc.

According to one aspect of the invention, it is contemplated that the computer or mobile device 12 will be operated by a user in an office, business, trading floor, classroom, or home setting.

As illustrated in FIG. 7, and as described in greater detail below, the inputs 30 may suitably include a data set of investable assets from which a portfolio of investments or a hedge is to be constructed; a set of requirements the portfolio of investments must meet; a model for generating simulated returns of all potential investments; one or more confidence levels; one or more investment portfolios or hedges; as well as one more user indications for a graphing order or graph type to be used in the graphical user interface or the preferred portfolio.

As further illustrated in FIG. 7, and as described in greater detail below, the system outputs 32 may suitably include a set of graphs displaying the portfolio return distributions in a specified order, and a preferred portfolio, hedge, or trade list.

The output information may appear on the graphical user interface display screen of the monitor 22 or may also be printed out at the printer 24. The output information may also be electronically sent to an electronic trading platform. The output information may also be electronically sent to an intermediary for interpretation. Other devices and techniques may be used to provide outputs, as desired.

Next, a CVaR based framework in accordance with the present invention is described for use in analyzing and improving portfolios. There are two main parts to this framework: (a), a Monte-Carlo pricing engine 663 shown in FIG. 6 that generates return scenarios for all the potential multi-asset class assets that may be included in the portfolio or the set of trades to be determined; and, (b), a modified and improved calculation engine 664 and method based on a modified version of the existing Rockafellar-Uryasev mathematical formulation to determine a portfolio, overlay, or trade list that minimizes CVaR at a sequence of confidence limits, as described further herein.

A presently preferred Monte-Carlo framework that is used to generate the instrument return scenarios or simulations is first described. General information on Monte-Carlo techniques can be found in P. Glasserman, *Monte Carlo Methods in Financial Engineering*, Springer, 2003, (Glasserman), which is incorporated by reference herein in its entirety. The Monte-Carlo pricing engine generates a matrix of asset return scenarios. If there are N assets and S Monte-Carlo simulations or scenarios, then the matrix of asset return scenarios will be an N by S matrix. The pricing engine will usually model each individual asset as being driven by a set of multivariate Gaussian market factors. These factors may include traditional equity factors such as industries, countries, currencies, and style factors such as size, value, growth, and momentum. Details of these equity factors are described and utilized in Axioma's suite of equity risk models. In addition, this set of market factors may include option pricing factors such as implied volatility and risk free rates such as LIBOR. The profit and loss (P/L) of each asset in each scenario is computed by numerically simulating the driving factors appropriately scaled over the time horizon and then computing the aggregate profit or loss of each asset according to the valuation characteristics of the asset. The valuation may use market prices or notional prices, depending on the kind of asset involved. This process produces a matrix of asset profit and loss (P/L) scenarios which is then converted to a matrix of asset returns by normalizing each asset's profit and loss by its initial market or notional value. Because of the large amount of data and the complexity of the calculations, the Monte Carlo pricing engine is preferably embodied in a network system of high speed servers which communicate with large databases of pricing data and models and one or more electronic trading platforms as shown in FIG. 6, for example, to achieve the desired speed of operation and to utilize the most up to date data as desired in the expected context of the present invention.

The portfolio manager may employ flexibility and discretion in choosing the pricing factors he or she deems best. For example, consider a portfolio that consists of all the assets in the S&P 500 Index and put options on each of the individual assets. Pricing all the puts requires the prices of all the S&P 500 underlying constituents as pricing factors. One can think of each of the equity prices as pricing factors. This approach is referred to as the granular risk resolution approach. Alternatively, a fundamental factor model, such as one provided by Axioma, can be used to map the individual equity prices to a set of fundamental factors (industry and styles factors such as value, momentum, etc.). For example, in the Axioma U.S. fundamental factor risk model, there are 78 fundamental factors that represent a parsimonious set of pricing factors. The equity prices are mapped to the fundamental factors via their exposures in the fundamental risk model. Alternatively, Axioma's U.S. statistical factor risk model may be employed to map equity prices to statistical factors via their exposures in the statistical risk model.

For most factors, including factors such as equity prices and volatility, the factor return is defined to be the relative change in the factor value. For fixed-income factors such as interest rates and credit spreads, the factor return is defined to be the absolute change in the factor value. The factor return distribution can also be parameterized by a student t distribution that has longer tails than the Gaussian distribution. Copulas can also be used to parameterize the joint distribution of the factor returns where the marginal distributions follow Gaussian or student t distributions. See McNeil and/or Glasserman, for example.

The asset scenarios are incorporated into an improved methodology based in part on an improvement upon the Rockafellar-Uryasev methodology. In the Rockafellar-Uryasev formulation, $w=(w\_1, w\_2, \ldots, w\_N)$ represents a vector of the market or notional value dollar holdings in the N different assets in the portfolio. It is desired to find a solution for each element of w that minimizes CVaR at confidence level & among all possible w that satisfy the constraints representing the portfolio manager's preferences and institutional mandates. The confidence level is a probability between zero and one hundred percent. Typically, it takes values close to 100%. For example, & could be 95% or 90%. Alternatively, instead of minimizing the CVaR of the portfolio, the same problem can be solved by imposing a maximum upper bound on the CVaR of the portfolio.

Rockafellar-Uryasev showed that the portfolio w that minimizes CVaR subject to linear constraints on the portfolio can be formulated as a linear programming problem. However, the solution to the linear programming approach is, in practice, sensitive to the estimation error in the scenarios.

In the improvement disclosed here, this approach is extended and improved upon by assuming that the scenarios are not point estimates but rather that the i-th scenario lies in an ellipsoidal uncertainty set. Technically, this ellipsoidal uncertainty set is defined in terms of an asset-asset covariance matrix Q and a constant κ. If m_i is the mean return vector for the N assets in the i-th scenario, and r_i is the simulated return vector for the N assets in the i-th scenario, then the uncertainty set for r_i is defined by $$(r\_i - m\_i)^T Q^{-1} (r\_i - m\_i) < \kappa^2 \qquad (1)$$

To immunize the optimal solution against estimation errors, a robust CVaR optimization problem is solved that finds the w among all w that satisfy the general constraints on the portfolio holdings and where r_i belongs to the ellipsoid set described by equation (1) that minimizes CVaR at confidence ε. This problem can be formulated as the solution of the scenario based second-order cone (SOCP) problem:

$$\min_{w,\alpha,u} \alpha + \kappa \sqrt{w^T Q w} + \frac{1}{S(1-\varepsilon)} \sum_{i=1}^{S} u\_i \qquad (2)$$

subject to the three sets of constraints. The first set of constraints relates w, α and u_i:

$$m\_i^T w + \alpha + u\_i \geq 0, i=1, \ldots, S \qquad (3)$$

The second set of constraint makes the auxiliary variables u_i all positive:

$$u\_i \geq 0, i=1, \ldots S \quad (4)$$

The third set of constraints represents the traditional constraints on the portfolio. These can include limits on the maximum asset holdings, the maximum risk or tracking error of the portfolio, and the like. In this problem, S is the number of scenarios or simulations; r_i denotes the i-th column of the asset-scenario return matrix; α is a dummy variable that provides an estimate of the VaR of the portfolio, and is determined as part of the solution process. The auxiliary variables u_i are determined as part of the solution, and their number is the same as the number of scenarios, S. The auxiliary variable u_i measures the excess loss in the i-th scenario over VaR. This variable is zero if the loss in the i-th scenario is less than VaR, implying that only scenarios with positive u_i actually contribute to the CVaR of the portfolio. Q is the asset-asset covariance risk model in linear form. Hence, $\sqrt{w^T Q w}$ represents the standard deviation risk of the portfolio, and K is a weighting factor to be chosen by the portfolio manager. Note that the addition of this risk term is not described in Rockafellar-Uryasev, and it advantageously converts Rockafellar-Uryasev's linear programming problem into an SOCP problem. The calculation of α is advantageous since it provides an estimate of VaR as part of the solution.

Axioma has been commercially selling portfolio and trade list construction software for over 15 years that efficiently solves SOCP problems including problems that include elliptical uncertainty regions such as the minimum CVaR optimization problem just described. The optimization engine of this product includes a SOCP solver, and the software has been designed to easily handle a wide range of commonly occurring portfolio and trade list constraints that might be imposed. This previously existing software has been adapted by the present invention to compute the results presented herein.

Alternatively, specialized first-order and decomposition approaches are available to solve this SOCP approximately and quickly when the number of samples is large. See, for instance, G. Iyengar and A. K. C. Ma, "Fast Gradient Descent Rule for Mean-CVaR Optimization," *Annals of Operations Research*, 205(2013), pp. 203-212, and A. Kunzi-Bay and J. Mayer, "Computational Aspects of Minimizing Conditional Value-at-Risk," *Computational Management Science*, 3(2006), pp. 3-27, both of which are incorporated by reference herein in their entirety.

When solving this portfolio construction problem, more scenarios are needed when the confidence level & increases towards 100% and techniques such as importance sampling (Glasserman) may be used to selectively generate more scenarios in the tail of the distribution.

In general, it is desirable to test the number of scenarios used in the optimization for both in-sample stability and out-of-sample stability. For in-sample stability, one tests if the optimal CVaR values exhibit small enough variation across scenarios of the same size. For out-of-sample stability, one tests if the sequence of optimized portfolios constructed using scenarios of the same size exhibit small variance in CVaR when computed on a much larger master set of scenarios.

One test sequence for testing both in-sample and out-of-sample stability is the following. A master set is defined using 50,000 scenarios. Next, 1,000 sub-samples of a fixed size are created from this master set. For example, the fixed size may contain 1,000 or 5,000 or 10,000 of the master scenarios, each randomly chosen. For each sub-sample, the optimized portfolio that minimizes the CVaR is computed.

In-sample stability can be assessed by comparing the statistics for each of these different portfolios. This comparison is shown by table 244 in FIG. 8. Here, the mean CVaR and standard deviation of CVaR are computed for sub-samples of size 1,000, 5,000, and 10,000. As can be seen, the metrics are all quite similar, especially for the 5,000 and 10,000 sub-sample sizes. This comparison establishes in-sample stability for the 5,000 and 10,000 sub-sample sizes.

Figure 8:
FIG. 8 shows a table of in-sample and out-of-sample statistics confirming the stability of scenario-based results determined utilizing aspects of the present invention.

Out-of-sample stability is assessed by comparing the statistics on each of the optimal portfolios using the full master set of 50,000 scenarios. Table 246 from FIG. 8 shows these metrics. Once again, there is little variation for 1,000, 5,000, and 10,000 sub-sample sizes. Hence, we can be confident that we have used sufficient sample sizes to obtain accurate results.

One of the important advantages of the present invention is derived from the recognition that, as a practical matter, when minimizing CVaR for investment portfolios, the objective function does not have a steep gradient. As a result, even though there may be a unique portfolio that minimizes CVaR over all possible portfolios satisfying the constraints imposed, there may be different portfolios that have advantageous properties. One of the disadvantages of traditional CVaR minimization is that the answer obtained is only optimal for the confidence level & prescribed. For different confidence levels, the portfolio obtained may be different. In other words, minimizing CVaR at the 95% confidence level only minimizes the average of the 5% worst losses in the return distribution. Minimizing only the CVaR value at the 95% confidence level may give a portfolio that has an undesirably high CVaR at, say, the 90% confidence level. Since the CVaR objective function is not steep, it may be that near-optimal solutions may do a better job of minimizing CVaR at several confidence levels at once.

One of the novel and important parts of the invention disclosed herein is the concept of hierarchical CVaR. Hierarchical CVaR is a method for constructing a portfolio or trade list that simultaneously minimizes or nearly minimizes the CVaR of the portfolio or trade list at more than one confidence level. Such portfolios have many advantageous properties as discussed further herein.

One general procedure for utilizing hierarchical CVaR is the following. Using a graphical user interface and a selector within the graphical user interface, a portfolio manager chooses a set of two or more confidence levels, $\varepsilon_1, \ldots \varepsilon_Z$, where the confidence levels are listed in descending order, and where Z, the number of confidence levels, is two or larger.

For example, the portfolio manager may specify two confidence levels, $\varepsilon_1 = 95\%$ and $\varepsilon_2 = 90\%$. Then, a sequence of portfolios are constructed. In the first portfolio construction, a portfolio is constructed that minimizes CVaR at confidence $\varepsilon_1$ for all the constraints imposed on the portfolio. The final numerical value of CVaR obtained from this optimization is saved as $CVaR_1$.

Next, a second portfolio construction problem is solved in which the CVaR is minimized at confidence $\varepsilon_2$ subject to the original portfolio constraints plus the additional constraint that the CVaR at confidence $\varepsilon_1$ is less than $CVaR_1$ times one plus Δ. That is, for this second portfolio, the $\varepsilon_2$ CVaR is minimized and the $\varepsilon_1$ CVaR is no worse than $CVaR_1$ times (1+Δ). Typically, Δ is on the order of 5%.

This procedure can be continued for multiple confidence levels, with each new solution ensuring that the CVaR for each of the previously obtained confidence levels is no worse than a factor of one plus Δ from the globally optimal CVaR at the confidence level. As a practical matter, the scenarios used for each confidence level should be independent, so for Z confidence levels, a total of Z times S total scenarios are needed.

As will be illustrated below, the return distributions obtained for portfolios and trade lists constructed using hierarchical CVaR are highly advantageous. Hierarchical CVaR allows the user to adjust the left tail of the return distribution in a direct and advantageous manner. In fact, by integrating the user specification of the confidence levels with the display of the resulting return distribution within a graphical user interface, an advantageous, powerful portfolio construction tool is obtained.

Next, the advantages of portfolio and trade list construction using CVaR and then hierarchical CVaR are illustrated using several representative examples.

In the first example, an equity portfolio is hedged with equity index options. Assume that an investment portfolio of long-only equities is owned as of Dec. 19, 2014. The equity assets may include any asset in the S&P 500 index. It is desired to hedge the risk of this portfolio over a three month horizon with European index puts on the S&P 500 Index with different strikes and three months to expiration. The universe or set of investments held comprises all equities in the S&P 500 index as of Dec. 19, 2014, and the universe or set of potential hedging investments is the set of puts on the S&P 500.

The risk of the equity assets is modeled using Axioma's World-Wide, Fundamental Factor, Equity Risk Model™, which includes style, country, industry, market, and currency factors.

For this first example, three different portfolio construction approaches are considered in order to illustrate the differences obtained by each approach.

In the first portfolio construction approach, the CVaR of the combined portfolio comprising the original equities held plus the hedging puts is minimized at the 95% confidence level over a three month hedging horizon. A budget is defined for the investment in the puts, which defines an upper limit to the cash value that can be invested in the puts. This budget is specified as a percentage of the value of the original equity portfolio value. Budget values of 1% and 5% of the equity investment value are employed. These two values represent a small budget and a large budget. Note that for this first example, hierarchical CVaR is not employed. CVaR is simply minimized with one confidence level in order to highlight its advantages over other portfolio construction approaches.

In the second portfolio construction approach, termed the "MVO delta-rho-vega" approach, the risk derived from the puts is modeled by linearizing their return characteristics about their current prices and the standard deviation of the risk derived from this model is also minimized. The three parameters in the name of this approach—delta, rho, and vega—are parameters in the Black-Scholes pricing model, which is described in J. C. Hull, *Options, Futures, And Other Derivatives,* 7th edition, Prentice Hall, 2008, (Hull) which is incorporated herein in its entirety. For the short, three month hedging horizon of this example, the option delta dominates the risk obtained in this approach, and the risk modeling mimics the delta hedging approach commonly used by traders. Note also that since the long-only equity portfolio is hedged with several possible index puts, there is no unique global optimal solution. That is, a solution can be found using any individual put in isolation.

In the third portfolio construction approach, termed the "MVO delta-gamma" approach, the risk model of the MVO delta-rho-vega approach is employed by adding the risk associated with option gamma (Hull). Unlike MVO delta-rho-vega approach, the MVO delta-gamma approach has a unique solution because it selects the portfolio that minimizes both the delta risk and the portfolio gamma.

Figure 9:
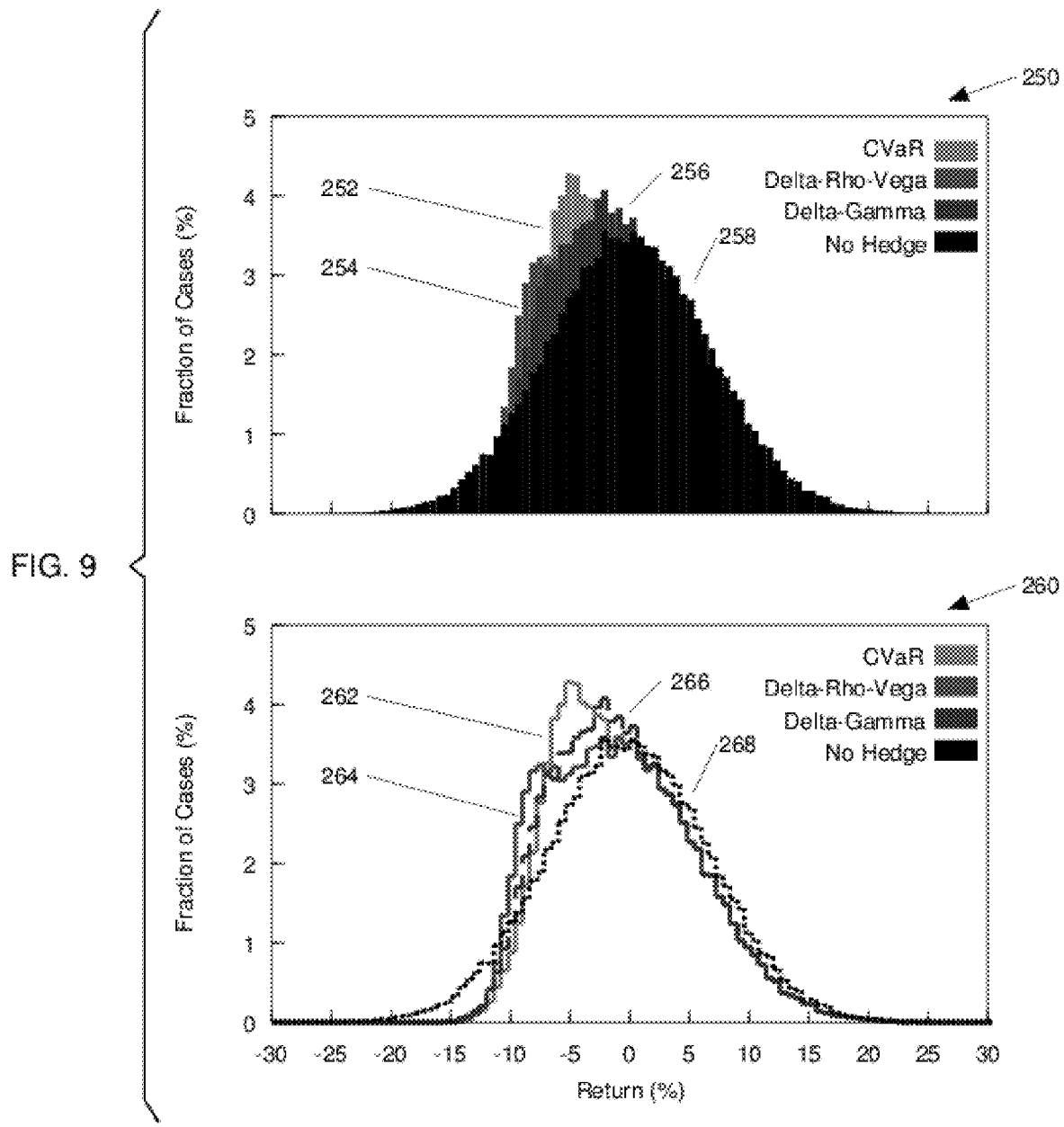
FIG. 9 shows return distributions for an original portfolio and three different hedges with a 1% budget.

The CVaR, MVO delta-rho-vega, and MVO delta-gamma approaches are first compared when the optimizer 650 is only allowed to purchase options with a budget of 1%. 50,000 scenarios are utilized to obtain the results shown in FIG. 9 which includes two charts 250 and 260 representing the same four return distributions. The return distribution for the original portfolio is plotted with the darkest color and is labelled "No Hedge". This distribution is return distribution 258 in chart 250 and return distribution 268 in chart 260. The return distribution for the MVO-delta-gamma hedged portfolio is plotted with the next darkest color and is labelled "Delta-Gamma". This is return distribution 256 in chart 250 and return distribution 266 in chart 260. The return distribution for the MVO-delta-rho-vega hedged portfolio is plotted with the next darkest color and is labelled "Delta-Rho-Vega". This is return distribution 254 in chart 250 and return distribution 264 in chart 260. Finally, the return distribution for the CVaR hedged portfolio at 95% confidence is plotted with the lightest color and is labelled "CVaR". This is return distribution 252 in chart 250 and return distribution 262 in chart 260. The charts 250 and 260 may be displayed on a display, such as display 22 of FIG. 7, with the tools described in conjunction with the discussion of FIG. 17.

A number of features are evident in chart 250. First, and foremost, when filling the bars on the return distribution, many salient aspects of the different return distributions are hidden. In particular, the left tail of the no hedge distribution 258 completely obscures the left tails of the three hedges 252, 254, and 256, so it is impossible from this chart to determine what the left tail looks like for the three hedges. This obscuration is a significant disadvantage.

For charts such as chart 250, it would be highly advantageous to be able to alter the order in which the return distributions are graphed interactively so that a better comparison can be made. It would also be advantageous to switch back and forth from the representation in chart 250 to the representation in chart 260, as discussed further below in conjunction with FIGS. 17 and 18.

In chart 260, each shape of each of the four return distributions is visible. Notice that the left tail of the three hedges are similar for returns less than about −12%, and that all three of the hedges are effective at reducing the likelihood of a large, negative return when compared to the unhedged original portfolio. Also, notice that the right tails of the three hedges are virtually indistinguishable for returns greater than zero. Chart 260 indicates that the principal difference between the three hedges is the shape of the return distribution between approximately −12% and 0%. These differences are clearly visible in chart 260. The ability to effectively and interactively construct portfolios that advantageously shape the return distributions in a region, such as this narrow region of returns and effectively display them are important aspects of the present invention.

Next, the CVaR, MVO delta-rho-vega, and MVO delta-gamma approaches are compared when the optimizer 650 is only allowed to purchase options with a larger budget of 5%. The larger budget gives flexibility to the portfolio construction problem, and it is anticipated that the differences between the three different hedges will be more pronounced.

Figure 10:
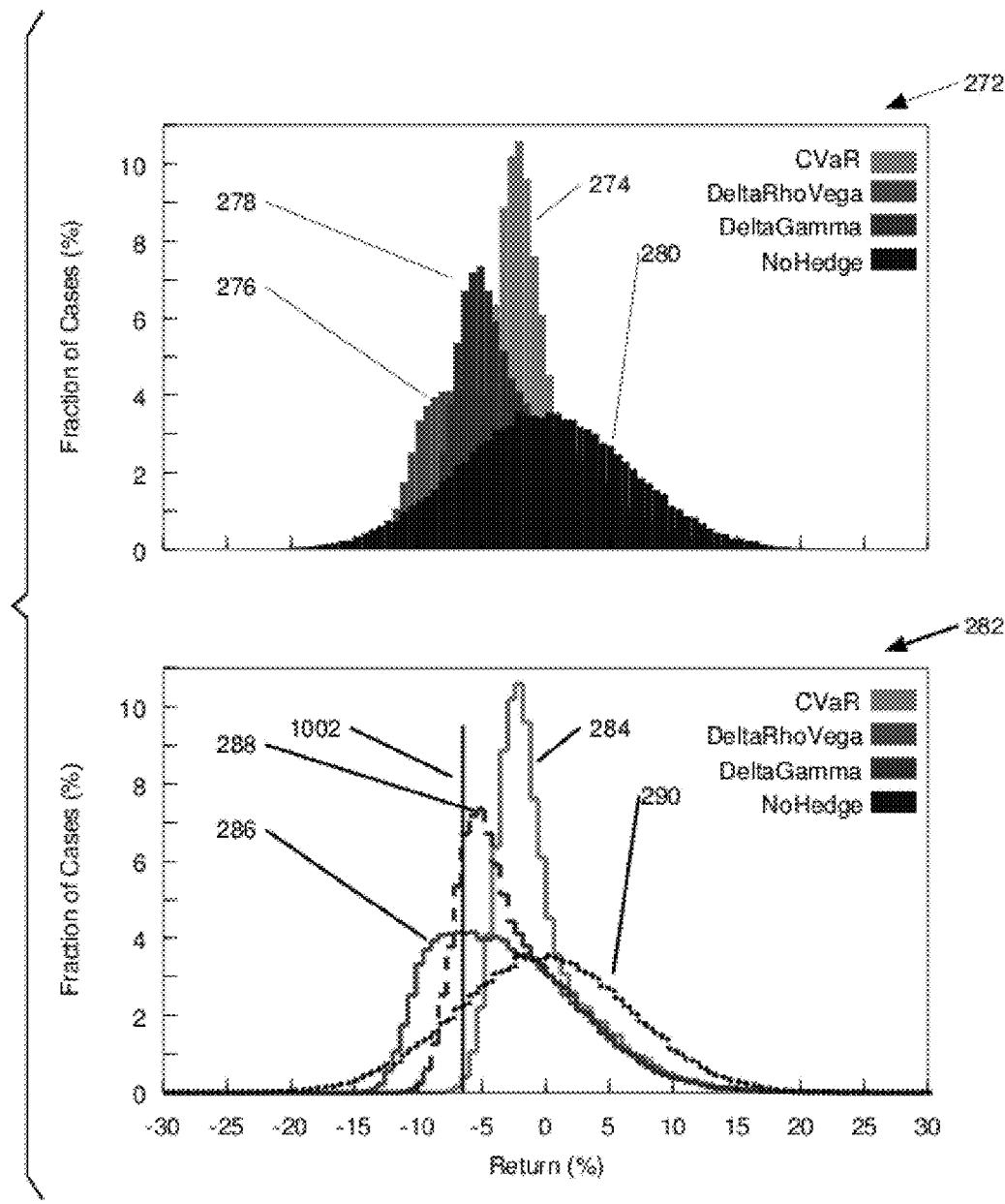
FIG. 10 shows return distributions for an original portfolio and three different hedges with a 5% budget.

As before, 50,000 scenarios are used to obtain the results. The results are shown in FIG. 10 which includes two charts 272 and 282, representing the same four return distributions. The return distribution for the original portfolio is plotted with the darkest color and is labelled "No Hedge". This is return distribution 280 in chart 272 and return distribution 290 shown as a dotted line in chart 282. The return distribution for the MVO-delta-gamma hedged portfolio is plotted with the next darkest color and is labelled "Delta-Gamma". This is return distribution 278 in chart 272 and return distribution 288 shown as a dashed line in chart 282. The return distribution for the MVO-delta-rho-vega hedged portfolio is plotted with the next darkest color and is labelled "Delta-Rho-Vega". This is return distribution 276 in chart 272 and return distribution 286 in chart 282. Finally, the return distribution for the CVaR hedged portfolio at 95% confidence is plotted with the lightest color and is labelled "CVaR". This is return distribution 274 in chart 272 and return distribution 284 in chart 282.

A number of features are evident in chart 272. First, and foremost, when filling the bars on the return distribution, many salient aspects of the different return distributions are hidden. In particular, the left tail of the no hedge distribution 280 completely obscures the left tails of the three hedges 274, 276, and 278, so it is impossible from this chart to determine what the left tail looks like for the three hedges.

As with chart 250, it would be advantageous in chart 272 to be able to alter the order in which the return distributions are graphed interactively so that a better comparison can be made. It would also be advantageous to be able to switch back and forth between the display in chart 272 and that in chart 282, as discussed further below in conjunction with FIGS. 17 and 18.

In chart 282, the shape of each of the four return distributions is visible. With the larger 5% budget, the three hedges are less similar than they were for the 1% budget case. The CVaR hedged portfolio return 284 has the best downside risk in that it is extremely unlikely that a return below −8% will occur. The delta-gamma return distribution has the next best downside risk in that it is unlikely that a return less than −12% will occur. Finally, the delta-rho-vega distribution has the next best downside risk in that it rarely has returns less than −16%. All three of these hedged portfolios possess improved downside risk as compared against the return distribution of the, no hedge, original portfolio 290.

FIG. 10 also includes a user supplied indication line 1002 indicating a return value (−6.8%) at which the user may want to carefully control the display order of the distributions in 282. As will be explained further herein, the ability to place the indicator 1702 at different places within the return distribution and advantageously display the return distribution in a specific order for that location is an advantageous aspect of the present invention as discussed further below in connection with FIGS. 17 and 18 below.

Next, the same two examples are taken—hedging a portfolio with S&P 500 puts with budgets of 1% and 5%—and the CVaR solution is compared with a hierarchical CVaR solution. For the hierarchical CVaR solution, CVaR is minimized at the 95%, 90%, 85%, and 80% confidence levels, in that order.

Figure 11:
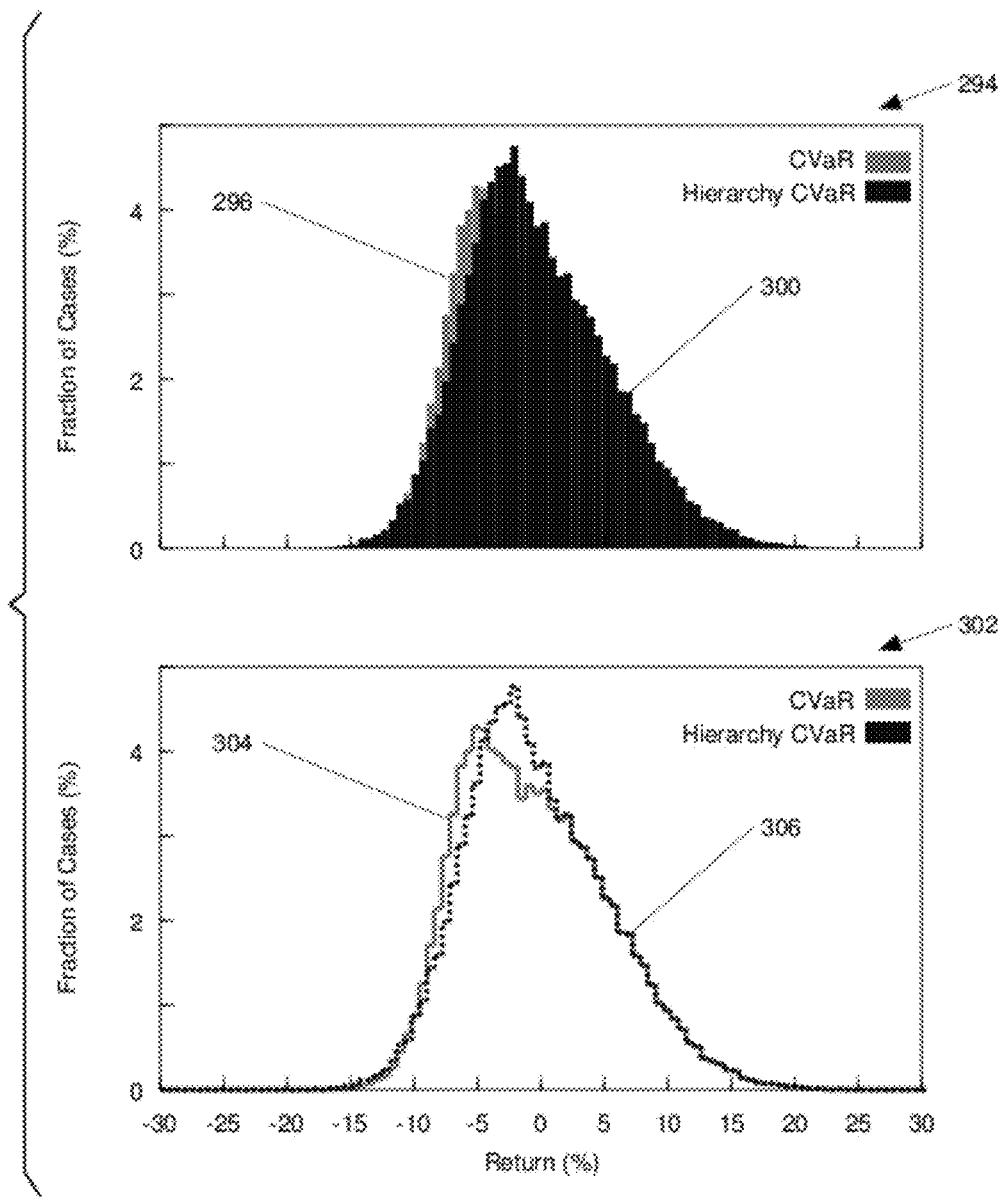
FIG. 11 shows return distributions for a CVaR and a hierarchical CVaR hedge with a 1% budget.

Charts 294 and 302 in FIG. 11 show the distribution of returns for the CVaR and hierarchical CVaR solutions with a budget of 1%. In chart 294, the CVaR distribution 296 is shown with the light gray bars 296 while the hierarchical CVaR distribution 300 is shown with the dark gray bars 300. In chart 302, the CVaR solution is shown with the light gray bars 304 while the hierarchical CVaR distribution is shown with the dark gray bars 306.

In chart 294, as before, it is seen that with return distributions plotted on top of each other, the details of the CVaR distribution 296 in the left tail are hidden by the hierarchical CVaR distribution 300. This display is disadvantageous. Improved display techniques are addressed further below in connection with FIGS. 17 and 18.

In chart 302, the return distribution of both solutions, CVaR 304 and hierarchical CVaR 306, shown as a dotted line, are visible. The hierarchical CVaR approach 306 shifts the return distribution to the right when compared with traditional CVaR. The right tails of both distributions are essentially indistinguishable, indicating that there is little difference in the upside risk of both approaches. The CVaR value at the 95% confidence level for the hierarchical CVaR approach 306 is 7.7%, as compared with CVaR value for the CVaR approach 304 which is 7.5%. That is, CVaR in the hierarchical CVaR approach is substantially the same as it is in the CVaR approach 304.

Notice as well that the differences in the two return distributions 304 and 306 fall primarily in the range of returns between −10% and 0%. Utilizing the tools addressed in FIGS. 17 and 18 below, portions of the display where differences exceed a predetermined percentage can be identified and highlighted. It is a range, such as the −10% and 0%, for this example, that a portfolio manager has the most discretion to alter, engineer, and improve the return distribution to achieve his or her objectives.

Figure 12:
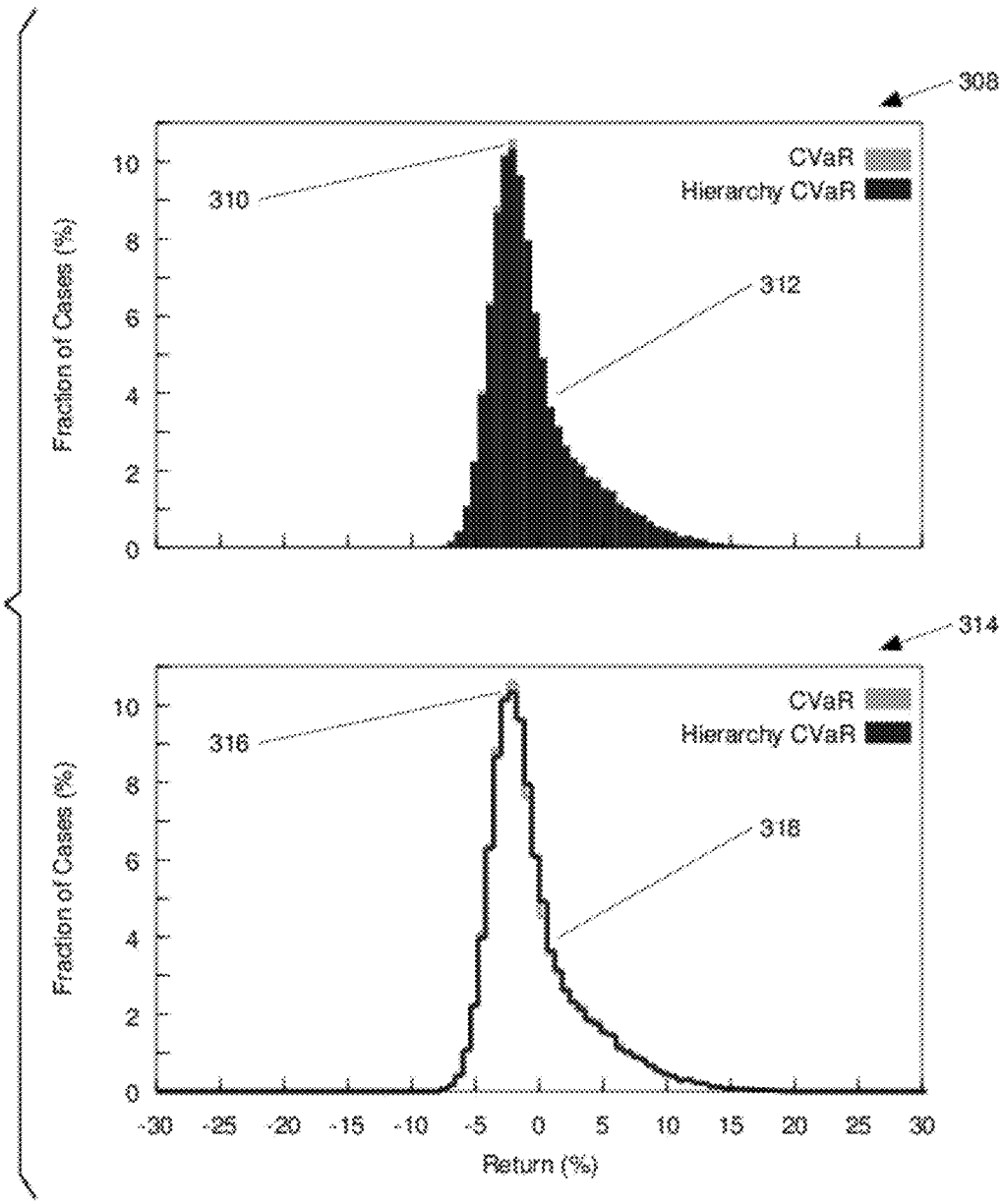
FIG. 12 shows return distributions for a CVaR and a hierarchical CVaR hedge with a 5% budget.

Charts 308 and 314 in FIG. 12 show the distribution of returns for the CVaR and hierarchical CVaR solutions with a budget of 5%. In chart 308, the CVaR solution is shown with the light gray bars 310 while the hierarchical CVaR solution is shown with the dark gray bars 312. In chart 314, the CVaR solution is shown with the light gray line 316 while the hierarchical CVaR solution is shown with the dark gray line 318.

In chart 308, as before, it is seen that with return distributions plotted on top of each other, the details of the CVaR distribution 310 in the left tail are hidden by the hierarchical CVaR distribution 312. Again, this display is disadvantageous. Improved display techniques are described below in conjunction with FIGS. 17 and 18.

In chart 314, the CVaR 316 and hierarchical CVaR 318, distributions are both visible. The hierarchical CVaR approach 318 shifts the return distribution to the right when compared with traditional CVaR. The right tails of both distributions are essentially indistinguishable, indicating that there is little difference in the upside risk of both approaches.

To give some a perspective on the solutions described in detail in FIGS. 9 through 12, the S&P 500 was trading at $2,070.65 on Dec. 19, 2014. When the budget is 1%, the CVaR approach spends its entire budget purchasing several put contracts with strikes of 2000. The hierarchical CVaR approach uses its entire budget to purchase put contracts with strikes of 2060. These latter contracts are more expensive but offer better downside risk protection. The MVO delta-rho-vega approach uses its entire budget to purchase cheaper put contracts with strikes of 1925. The MVO delta-gamma approach uses part of its budget to purchase cheaper puts with strikes of 1925 and the rest in purchasing expensive puts with strikes of 2075.

When the budget is 5%, the CVaR and the hierarchal CVaR approaches both purchase the expensive put contracts with strikes of 2075. In the 5% budget case, neither of the approaches uses its entire budget—the hierarchal CVaR approach spends a little more of its budget than the CVaR approach. The MVO delta-rho-vega approach continues to purchase the less expensive put contracts with strikes of 1925 and does not use up its entire budget. The MVO delta-gamma approach is the only approach that uses up its entire budget. It spends about 60% of the budget in purchasing the less expensive put contracts with strikes of 1925 and the rest of the budget in purchasing the most expensive contracts with strikes of 2075.

Figure 13:
FIG. 13 shows a table of statistical results for an original portfolio and four different hedges with a 1% budget.

FIG. 13 shows a table 330 that reports the statistics associated with each of the five return distributions addressed above: the unhedged portfolio, the delta-gamma hedge, the delta-rho-vega hedge, the CVaR hedge, and the hierarchical CVaR hedge. The statistics reported include CVaR (the expected loss at the 95% confidence level), the mean return, the standard deviation of returns, MVO (which is the objective function of the MVO delta-rho-vega model), the worst return, the best return, VaR, and right CVaR (the expected gain at the 95% confidence level). The table 330 may be displayed on a display, such as display 22 of FIG. 7 in conjunction with a chart like FIG. 9 adapted as discussed in connection with FIGS. 17 and 18 to allow a user to readily customize the display to more clearly and easily focus on the differences.

When the budget is small, as it is in this example, the four hedges give similar results for these statistics. Of course, the portfolio with the smallest CVaR is the CVaR portfolio, with a CVaR of 10.06%. The hierarchical CVaR is only slightly larger at 10.43%, and the CVaR of the other two hedges are similar as well at 10.50% and 10.26%, respectively, and both are substantially less than the value for the unhedged portfolio at 13.99%. The lowest MVO value is obtained for the MVO-delta-rho-vega approach, but, again, the values for the four hedges are relatively close and all are substantially better, in other words, less risky, than the value for the unhedged portfolio.

Figure 14:
FIG. 14 shows a table of statistical results for an original portfolio and four different hedges with a 5% budget.

FIG. 14 shows a table 332 that reports risk statistics associated with each of the five return distributions: the unhedged portfolio, the delta-gamma hedge, the delta-rho-vega hedge, the CVaR hedge, and the hierarchical CVaR hedge. The statistics for the unhedged portfolio are the same as in table 330. The CVaR hedged portfolio return 284 and the hierarchical CVaR portfolio return 318 have the best downside risk statistics. More particularly, the worst returns, and standard deviations for CVaR and hierarchal CVaR are smaller than those of the MVO delta-rho-vega 286 and MVO delta-gamma 288, respectively. Moreover, the right CVaRs for the CVaR and hierarchical CVaR portfolios are very close and slightly smaller than the right CVaR for the MVO delta-rho-vega and MVO delta-gamma portfolios, showing that the CVaR hedged portfolio and the hierarchical CVaR portfolio have the largest skew among these portfolios. In other words, the CVaR and hierarchical CVaR approaches reduce the portfolio downside without taking much away from the upside. This reduced downside with slightly reduced upside is one of the advantages of the CVaR and hierarchical CVaR approaches when compared with the traditional MVO approaches.

Although, the MVO delta-rho-vega objective values for the MVO delta-rho-vega and MVO delta-gamma portfolios are much smaller than the corresponding values for the CVaR hedged and hierarchical CVaR portfolios, the other distribution statistics are worse. That the MVO portfolios are better for the values which they minimize is not surprising. The poor performance of the MVO approaches can be attributed to the linear model for the puts, which does not capture the asymmetric payouts of these instruments.

FIG. 15 presents an illustrative graphical user interface or display that may be employed to take advantage of various aspects of the present invention. The graphical user interface is comprised of upper and lower portions 346 and 334, respectively. In the lower portion 334, an interactive table and user indicators are used to interactively construct portfolios. In portion 334, there is a main design table 336 in which different portfolios or hedges are specified. In the illustrative upper portion 334, there are four portfolios or hedges listed, numbered 1, 2, 3, and 4. These four portfolios or hedges may be selected from a drop down menu on a display screen such as display screen 226 of FIG. 5A or display screen 234 of FIG. 5B modified to include a drop down menu 233 or 235, respectively. A second column in the table includes checkboxes which can turn portfolios from active to inactive portfolios. Active portfolios are analyzed and displayed. Inactive portfolios are not. In this instance, the design parameters include the budget size, the CVaR tolerance to use for hierarchical CVaR optimizations, and a series of up to four confidence limits. Each portfolio has an "Export" user indicator 338 which, when indicated, will export the portfolio to either a database or electronic trading system. Finally, the user may list the plotting order in the boxes 340. When the return distribution is displayed, the return distributions will be plotted in the order indicated in box 340.

The interactive hedge design environment includes an "ADD" button 342. Depressing or activating this button adds another row to the table so that additional portfolios may be designed. Finally, there is an "UPDATE' button 344. Depressing or activating this button causes the return distribution to be updated and redisplayed, in the order listed in box 340.

The upper portion of this user interface shows the three active portfolio return distributions in chart 346. In other embodiments, a table of statistics may also be included as part of this display.

The purpose of the multi-asset class hedging environment shown in FIG. 15 is to show that portfolio managers may interactively craft different hedges and investment solutions. By adjusting the various design parameters in table 334, a portfolio manager may obtain and select a preferred hedging portfolio, and then export it either to a database or electronic trading system.

Figure 16:
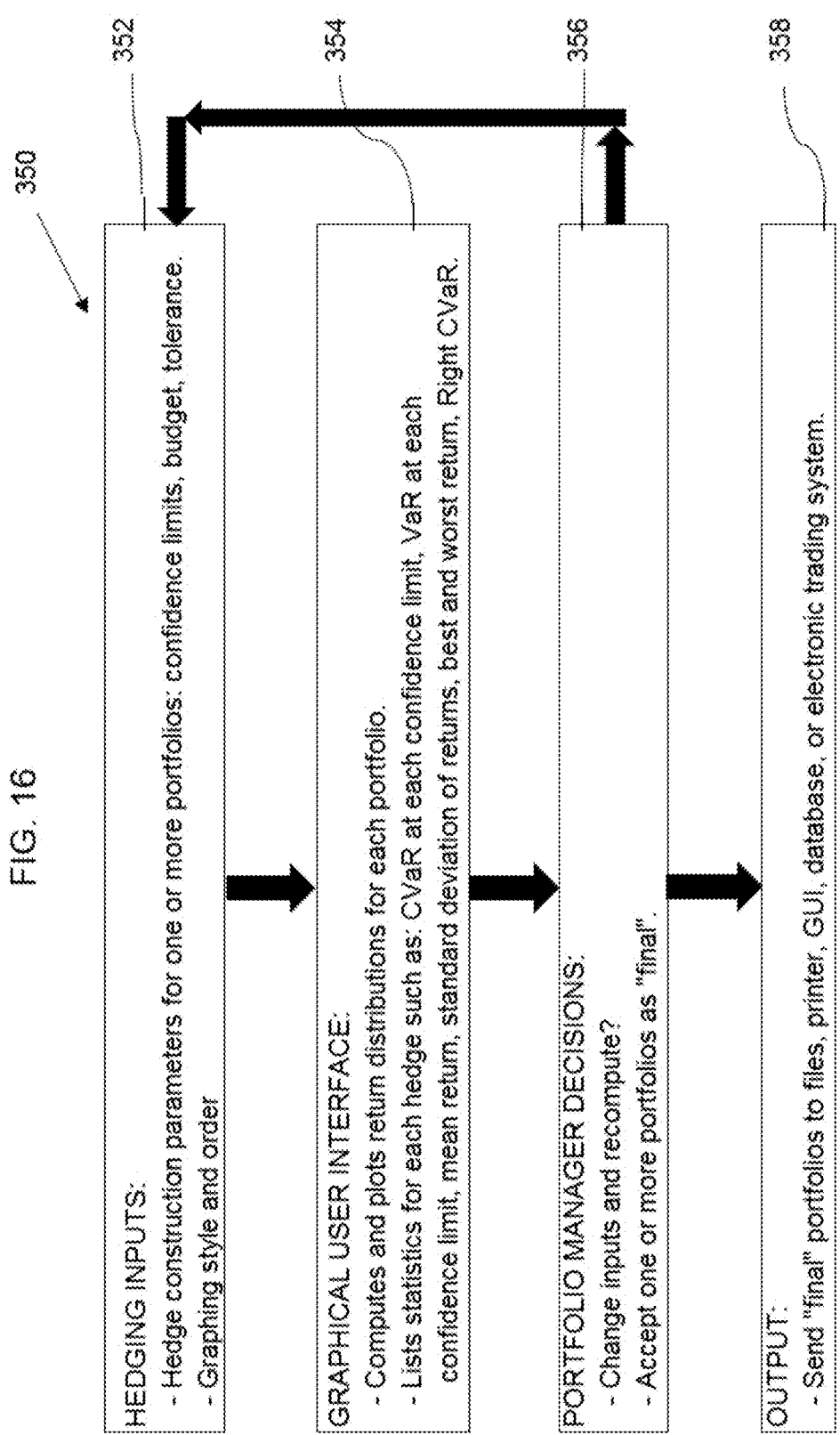
FIG. 16 shows a representative flow diagram of how the invention may suitably be utilized within an interactive graphical user interface.

The flow diagram 350 shown in FIG. 16 illustrates how the present invention may suitably be utilized within an interactive graphical user interface. In a first step 352, the portfolio manager or other user provides hedging inputs to the system. These may include hedge construction parameters for one or more portfolios such as confidence limits, budgets, and tolerances. These inputs would be similar to those shown in table 334. In addition to the hedging parameters, the portfolio manager or other user could input directions for how the return distributions would be graphed such as a style of graphing or an order in which to draw the graphs. As an alternative to manual input of graphing order, an automatic approach as illustrated in FIGS. 17 and 18 may be employed.

In a second step 354, the graphical user interface operates to ensure that all the portfolio manager's inputs were correctly input into the system, compute all the necessary calculations for determining the simulated return scenarios, return distributions, and the hedge or portfolios which optimally satisfied the constraints imposed on it by the portfolio manager. Once these computations are performed, the graphical user interface and its related software and hardware then coordinate the display of the results. This display may suitably include graphical representations of the return distributions for each portfolio, displayed in the format and order requested, as well as other relevant statistics used to evaluate the results. These statistics could include CVaR and VaR for each confidence limit analyzed, the mean return, the standard deviation of returns, the best and worst returns, and the right CVaR. In other words, the statistics would be similar to charts 330 and 332.

In a third step 356, the portfolio manager would interactively make decisions. One decision would be to alter the inputs and recompute the results. In this case, the flow chart would return to the first step, 352, and repeat the sequence of steps 352, 354 and 356. Alternatively, the portfolio manager may decide that one or more hedges or portfolios were final. Note that in some cases, the decision on what portfolio or hedge is final would be automated and be determined automatically. In other cases, the portfolio manager may manually make that decision and interact with the graphical user interface accordingly.

In a fourth step 358, when hedges or portfolios are deemed final, these portfolios are electronically output to files, printers, other graphical user interface windows, other software analysis packages, databases, or electronic trading systems for execution.

Figure 17:
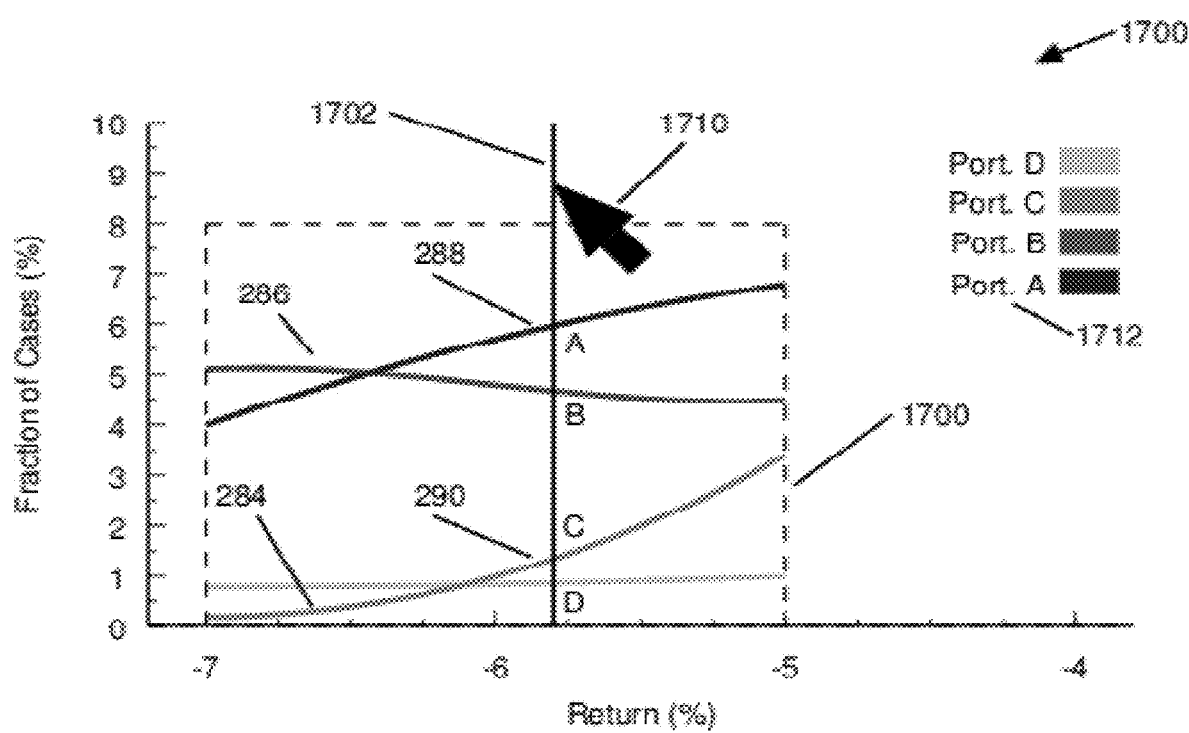
FIG. 17 shows an exploded view of portions of the distributions illustrated in FIG. 10 and illustrates aspects of a display tool in accordance with the present invention.
Figure 18:
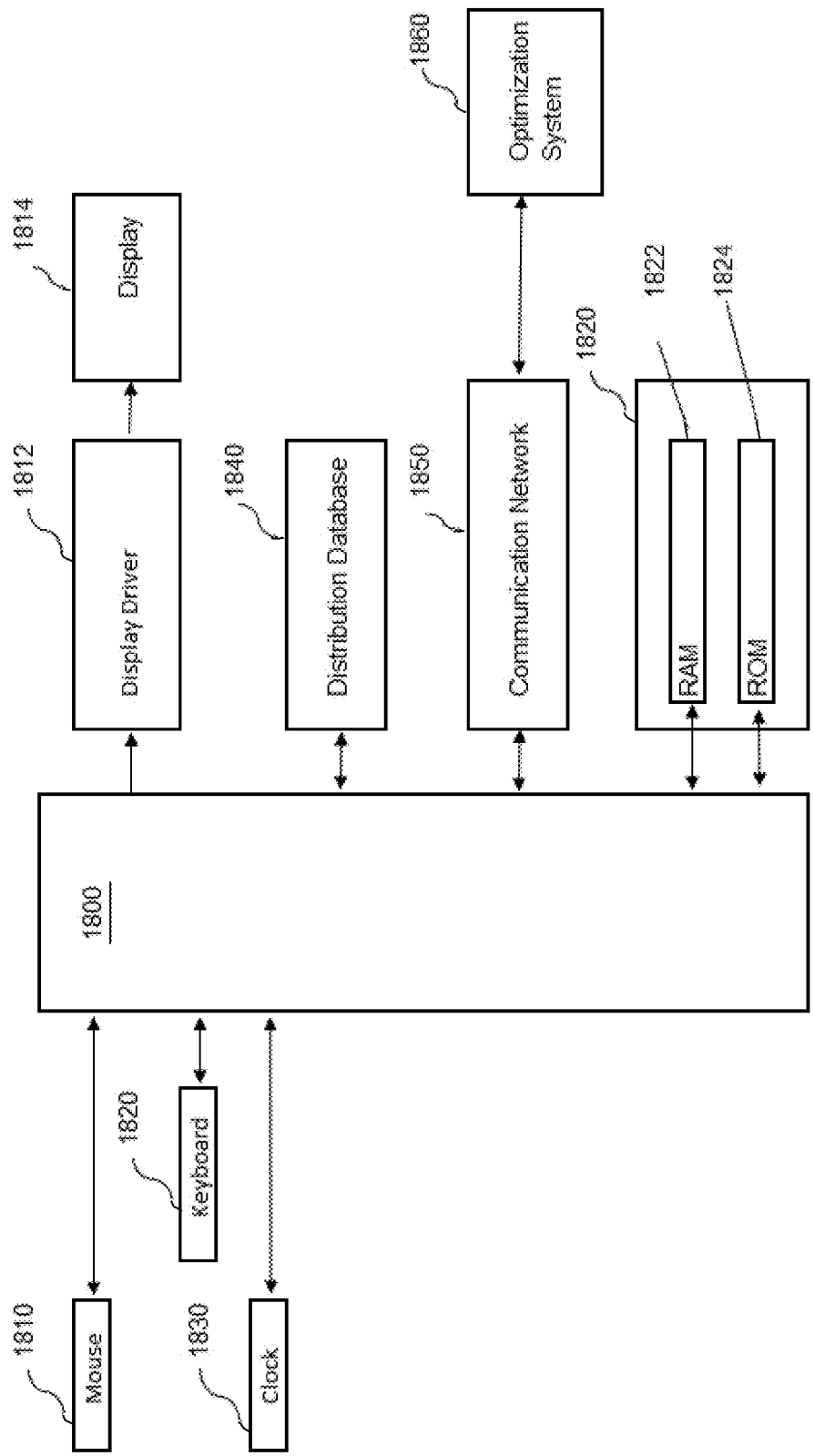
FIG. 18 shows a programmed microprocessor embodiment illustrating aspects of the present invention.

FIG. 17 shows an exploded view of portions of the distributions 284, 286, 288 and 290 of FIG. 10 located within a window 1700 surrounding a line 1702 like the line 1002 shown in FIG. 10, but moved slightly to the right. A cursor 1710 is shown hovering in FIG. 17. The x coordinate, −5.8%, of this hovering is detected as addressed further below and line 1702 is generated and displayed on a display, such as the display 22 of FIG. 7. The window 1700 has a predetermined width, such as 2%, as shown, and is also preferably displayed. Intersection points, A, B, C and D of line 1702 and distributions 288, 286, 290 and 284, respectively, are also shown. The y coordinates of each of these distributions at the x coordinate, −5.8%, are also determined. Knowing the y coordinates or the portions of the curves 288, 286, 290 and 284 of interest, these curves can be automatically displayed in the order shown so that overlapping does not obscure the data illustrated in the window 1700 of interest. It will be recognized that in another window of interest, such as one around an x-coordinate of −3%, for example, a different ordering of distributions 284, 288, 286 and 290 will be advantageously, automatically generated to prevent obscuring the relevant data in the window of interest. Alternatively, as noted above, a user may manually select an order of display or the user may check on a particular distribution bumping it to the top or showing it in isolation as desired by the user.

As such, the present invention provides a useful tool for displaying multiple distributions simultaneously while allowing a user to readily focus on portions of the distribution of most interest. As noted above, once an area of interest is located by the user, tables of statistical data can be readily generated and displayed to further flesh out pros and cons of one distribution vis vis a second, or a third or so on.

FIG. 18 shows a programmed microprocessor 1800 which receives location data from a mouse device 1810. This location data is utilized by microprocessor 1800 to control location of a cursor displayed on a display 1814 by controlling a display driver 1812. Memory 1820, including RAM 1822 and ROM 1824, stores software which is provided to microprocessor 1800, and receives and provides data to microprocessor 1800. Clock 1830 provides clock signals to microprocessor 1800 which utilizes such signals and software to detect if the mouse 1810 is hovering by remaining in place for a predetermined time in which case a line such as line 1702 of FIG. 17 is displayed on the display 1814. A distribution database 1840 stores data for distributions, such as distributions 284, 286, 288 and 290 of FIGS. 10 and 17, for example. Such data may be obtained from an optimizer system 1860 or optimizer 650 of FIG. 6 which the microprocessor 1800 communicates with using a communication network 1850.

Further user input may be provided by a user utilizing the mouse 1810 to click on an icon or selector displayed on display 1814 or utilizing a keyboard 1870. Examples of further user inputs include multiple confidence levels, $\varepsilon_1$, $\varepsilon_2$, and $\varepsilon_3$, such as 95%, 90% and 85%, for example, and selections of a hedging objective function to be minimized such as CVaR, hierarchal CVaR, delta-rho-vega and delta-gamma, for example.

While the present invention has been disclosed in the context of various aspects of presently preferred embodiments, it will be recognized that the invention may be suitably applied to other environments consistent with the claims which follow.

What is claimed is:

1. A computer-implemented method for interactively comparing performance of a plurality of investment portfolios within a window of a graphical user interface, the method comprising:

electronically computing by a programmed computer a plurality of return distributions corresponding to the plurality of investment portfolios, the plurality of return distributions comprising a first return distribution corresponding to an investment portfolio constructed with no hedge for risk, as well as one or more return distributions corresponding to investment portfolios constructed with different hedges for risk;

determining a left-tail return value and an ordering of the return distributions such that, for all return values less than the left-tail return value, the fraction of cases of each ordered return distribution is greater than or equal to the fraction of cases of the return distributions of all return distributions coming later in the ordering;

displaying a first graphical representation of the return distribution for each investment portfolio as a bar graph of a solid color within the window of the graphical user interface on a computer screen in the display order such that the bar graph of each subsequent return distribution is displayed over and without obscuring bars of any previously displayed return distribution for return values less than the left-tail return value since a corresponding bar displayed on top of a previous bar is never taller than any previously displayed bars;

displaying a second graphical representation of the return distribution for each investment portfolio as a line within the same window of the graphical user interface proximate to the first graphical representation so that, apart from when one line crosses another in the representation, the line corresponding to one return distribution does not obscure the lines of any other distributions, regardless of the ordering in which the lines are displayed;

monitoring, by a processor, a location of a user pointer indication to detect when the user pointer indication is located and hovering within the window of the graphical user interface displaying the return distributions;

automatically determining an indicated return value corresponding to the return value of the displayed return distributions wherever the user pointer indication is located and hovering within the graphical user interface displaying the return distributions; and automatically altering, by the processor, the display order in which the bar graphs of the return distributions are ordered so that, at the indicated return value corresponding to the user pointer indication, no return distribution completely obscures any other return distribution.

2. The computer-implemented method of claim 1 wherein the different hedges for risk can utilize a conditional value at risk (CVaR) metric, a mean-variance optimization (MVO) delta-rho-vega risk metric, or an MVO delta-gamma risk metric.

3. The method of claim 1 wherein the processor constantly monitors the activation of a second user indication capable of indicating a selection of a preferred return distribution and a corresponding preferred investment portfolio;

automatically electronically outputting the preferred investment portfolio selection whenever the second user indication is activated.

4. The method of claim 3 wherein each of the plurality of investment portfolios is constructed to minimize a conditional value at risk (CVaR) estimate at a plurality of confidence limits.

5. The method of claim 4 wherein at least one confidence interval is between 90% and 99%.

6. The method of claim 4 wherein the CVaR minimization employs a regularized Rockafeller-Uryasev methodology modified to utilize returns lying within an elliptical uncertainty set.

7. The method of claim 4 wherein a second window in the graphical user interface displays a table of each confidence limit and the CVaR at each confidence limit for each investment portfolio.

8. The method of claim 7 wherein the table in the second window in the graphical user interface also displays a budget for each investment portfolio.

9. The method of claim 8 wherein the processor constantly monitors the table within the second window for changes in individual confidence limits or budgets;

whenever a change in the confidence limits or budget is detected for an investment portfolio, the investment portfolio and return distributions are recomputed using those changes, and the displayed return distributions and CVaR values in the graphical user interface are automatically updated.

10. The method of claim 1 wherein at least one of the plurality of investment portfolios is an existing portfolio and at least one other investment portfolio is a hedge to reduce a risk estimate of the existing portfolio.

* * * * *